US010876446B2

(12) United States Patent
Gaikwad et al.

(10) Patent No.: US 10,876,446 B2
(45) Date of Patent: Dec. 29, 2020

(54) SYSTEM AND APPARATUS FOR A DIAGNOSTIC BREATHER DRYER HAVING A COUPLEABLE EXPANSION PACK

(71) Applicant: DES-CASE CORPORATION, Goodlettsville, TN (US)

(72) Inventors: Nikhil Rajkumar Gaikwad, Goodlettsville, TN (US); Jonathan Lee Haworth, Hendersonville, TN (US)

(73) Assignee: Des-Case Corporation, Goodlettsville, TN (US)

( * ) Notice: Subject to any disclaimer, the term of this patent is extended or adjusted under 35 U.S.C. 154(b) by 177 days.

(21) Appl. No.: 15/979,095

(22) Filed: May 14, 2018

(65) Prior Publication Data

US 2019/0345854 A1    Nov. 14, 2019

(51) Int. Cl.
*B01D 53/26* (2006.01)
*F01M 13/04* (2006.01)
*F01M 13/00* (2006.01)

(52) U.S. Cl.
CPC ........... *F01M 13/04* (2013.01); *B01D 53/263* (2013.01); *B01D 53/266* (2013.01);
(Continued)

(58) Field of Classification Search
CPC ............ B01D 53/0415; B01D 53/0454; B01D 53/261; B01D 53/263; B01D 53/266; B01D 53/30; B01D 2257/80; B01D 2259/4516; B01D 2259/4525; F01M 13/04; F01M 2013/0044; F01M 2013/0083; F01M 2013/0438; F01M 2013/0477
(Continued)

(56) References Cited

U.S. PATENT DOCUMENTS 4,504,289 A * 3/1985 Waller ................. B01D 53/261
                                                              55/318
4,546,442 A   10/1985 Tinker
(Continued)

OTHER PUBLICATIONS

Brocure: "Dual Column Dehydrating Breather Manual; DCB-Manual-1.8," Waukesha, Apr. 2019.*
(Continued)

*Primary Examiner* — Frank M Lawrence, Jr.
(74) *Attorney, Agent, or Firm* — Patterson Intellectual Property Law, P.C.; Ryan D. Levy; Grant M. Ford

(57) ABSTRACT

Systems, apparatuses, and methods are provided for implementing a system for providing a breather for a reservoir. The system includes a breather including a housing a dehumidifying element therein. The system further includes an operational sensor positioned within the housing, the operational sensor configured to output a sensor signal indicative of a measured operational parameter of the breather, and an expansion pack coupleable to the housing, the expansion pack is configured to receive the sensor signal indicative of the measured operational parameter and to transmit at least one of the measured operational parameter or a representation thereof. The system includes a control unit communicatively coupleable to the expansion pack having a processor, a display unit, and a storage. The processor executes a control application configured to receive the at least one of the measured operational parameter or representation thereof.

22 Claims, 17 Drawing Sheets

(52) U.S. Cl.
CPC . *B01D 2257/80* (2013.01); *F01M 2013/0044* (2013.01); *F01M 2013/0083* (2013.01); *F01M 2013/0438* (2013.01); *F01M 2013/0477* (2013.01)

(58) Field of Classification Search
USPC .......... 55/385.4; 96/109, 111, 112, 113, 117, 96/117.5
See application file for complete search history.

(56) References Cited

U.S. PATENT DOCUMENTS

| | | | | |
|---|---|---|---|---|
| 5,988,164 | A | 11/1999 | Paluch | |
| 6,217,639 | B1 * | 4/2001 | Jackson | B01D 53/0415 55/385.4 |
| 10,213,725 | B2 * | 2/2019 | Gaikwad | B01D 53/0454 |
| 10,226,732 | B2 * | 3/2019 | Gaikwad | B01D 53/0407 |
| 2004/0255598 | A1 | 12/2004 | Haws et al. | |
| 2005/0103195 | A1 | 5/2005 | Golner | |
| 2013/0061751 | A1 * | 3/2013 | Martin | B01D 53/261 95/126 |
| 2014/0165828 | A1 * | 6/2014 | Martin | B01D 53/0454 95/26 |
| 2016/0096138 | A1 * | 4/2016 | Martin | B01D 53/261 95/114 |
| 2017/0128878 | A1 * | 5/2017 | Gaikwad | B01D 53/0454 |

OTHER PUBLICATIONS

International Search Report and the Written Opinion of corresponding International Application No. PCT/US2018/032686, dated Apr. 8, 2019, 14 pages.

* cited by examiner

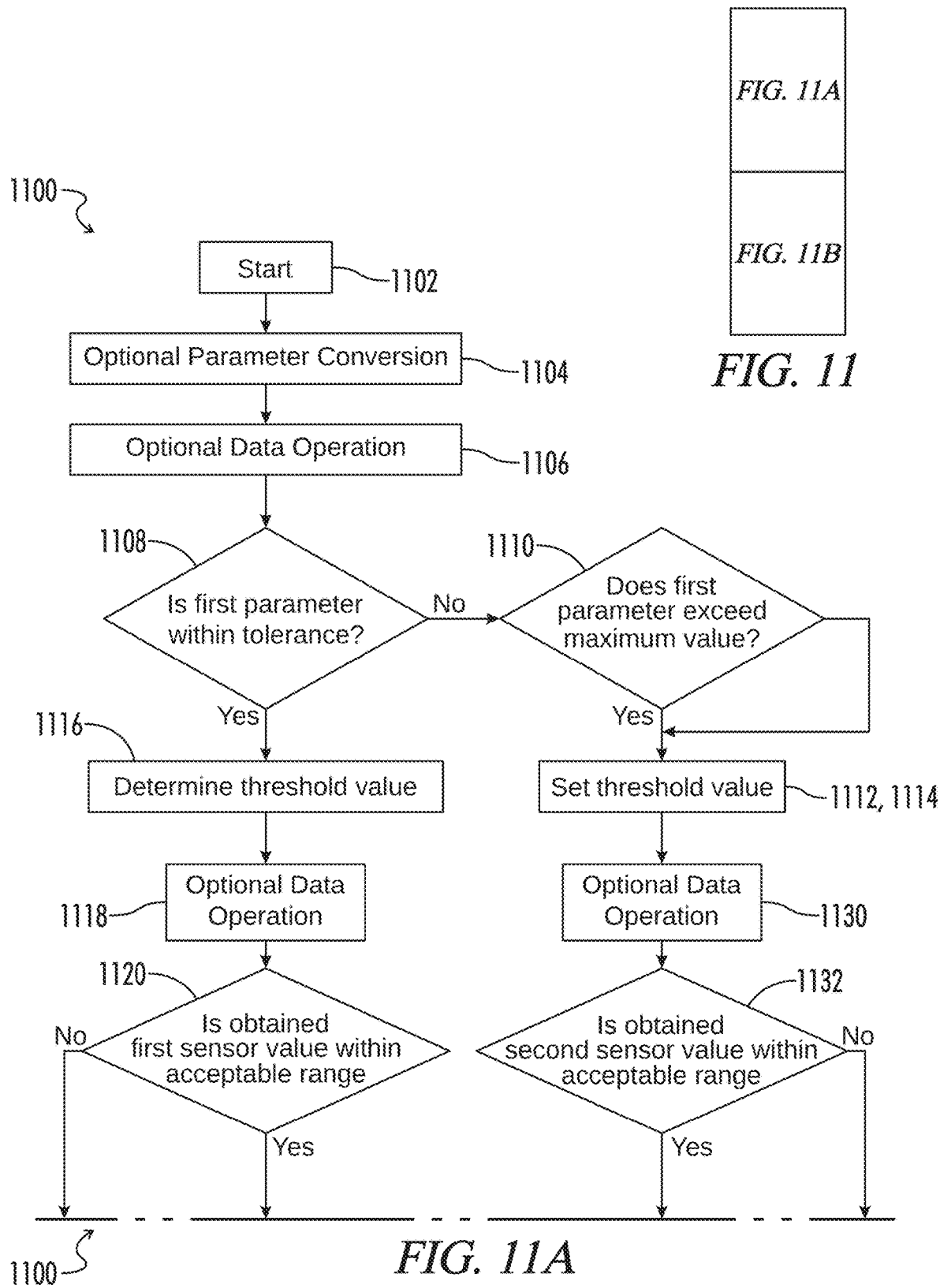

US 10,876,446 B2

SYSTEM AND APPARATUS FOR A DIAGNOSTIC BREATHER DRYER HAVING A COUPLEABLE EXPANSION PACK

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to breathers for liquid reservoirs. More particularly, the present invention relates to humidity controlling breathers for liquid reservoirs.

Breathers allow for expansion of liquids and gases (e.g., air) in liquid (e.g., lubricant) reservoirs while preventing contamination of the liquid. For liquid reservoirs such as engine crank cases and lubricant storage reservoirs, water vapor and dust particles in the air can be pulled into the liquid by the expansion and contraction action of the air and liquid in the reservoir with changes in temperature or barometric pressure of the surrounding environment and the contents of the reservoir (i.e., fluid level changes in the reservoir). Currently, breathers are replaced on a schedule, whether the breathers are at the end of their useful life or not because it is difficult to tell when a breather has reached the end of its useful life. Alternatively, breathers utilize color changing desiccants to indicate when the breather has reached the end of its useful life and needs replacement. The color changing desiccants require transparent breather housings which are generally weaker than opaque breather housings, present chemical incompatibility issues, and the chemicals used to change color may be considered toxic under some guidelines. Further, the color change may be faint, difficult to see depending on the location and environment of the reservoir and breather, and therefore difficult to interpret. For example, breather dryers (e.g., desiccant breathers) are commonly mounted on lubricating fluid reservoirs in large format wind turbines. The nacelles in these turbines are typically cramped and include many poorly lit, hard to reach areas near lubrication reservoirs where breathers are located. Visibility of the breather and any color change is therefore difficult to see. Additionally, the nacelle may typically only be accessed when the wind turbine is shut down (i.e., stopped and not generating power).

BRIEF SUMMARY OF THE INVENTION

Aspects of the present invention provide a breather with a dehumidifying element, such as a desiccant or deliquescent, and an electronic end of life detection system. A temperature sensor and humidity sensor provide a temperature and humidity of the dehumidifying element to a controller. The controller determines the relative humidity of the dehumidifying element, and determines that the dehumidifying element, and thus breather, has reached its end of life (i.e., end of useful life) when the relative humidity reaches a predetermined relative humidity (e.g., 40%).

According to one aspect of the present disclosure, provided is a breather for a reservoir. The breather includes a housing including: a dehumidifying element positioned within the housing such that air passing through the breather from the outside to the inside or from the inside to the outside of the reservoir must pass through the dehumidifying element, an operational sensor positioned within the housing, wherein the operational sensor is configured to output a sensor signal indicative of a measured operational parameter of the breather, and an expansion pack coupleable to the housing, the expansion pack configured to receive the sensor signal indicative of the measured operational parameter and to transmit at least one of the measured operational parameter or a representation thereof.

The breather may include a plurality of operational sensors each coupleable to the expansion pack when the expansion pack is coupled to the breather. The plurality of operational sensors may include a temperature sensor configured to measure a temperature of an inside of the housing adjacent to the temperature sensor, a first humidity sensor configured to measure a first humidity level adjacent to a location of the first humidity sensor within the housing, and a second humidity sensor configured to measure a second humidity level adjacent to a location of the second humidity sensor within the housing. The expansion pack may transmit each of a representation of an output of the temperature sensor, a representation of an output of the first humidity sensor, and a representation of an output of the second humidity sensor. The expansion pack may transmit each of the representation of the output of the temperature sensor, the representation of the output of the first humidity sensor, and the representation of the output of the second humidity via at least one of a wired connection and/or a wireless connection.

The expansion pack may include a controller which performs at least one operation upon at least one of the representation of the output of the temperature sensor, the representation of the output of the first humidity sensor, or the representation of the output of the second humidity sensor, and transmits at least a representation of the operated upon at least one of the representation of the output of the temperature sensor, the representation of the output of the first humidity sensor, or the representation of the output of the second humidity sensor. The controller is configured to determine at least one end of life parameter based at least in part upon one or more of the representation of the output of the temperature sensor, the representation of the output of the first humidity sensor, and the representation of the output of the second humidity sensor. The controller may transmit a representation of the determined at least one end of life parameter. The expansion pack may include a connector configured to enable electrical communication between the expansion pack and the breather.

A further aspect of the present disclosure relates to a system for providing a breather for a reservoir. The system includes a breather having: a housing, a dehumidifying element positioned within the housing such that air passing through the breather from the outside to the inside or from the inside to the outside of the reservoir must pass through the dehumidifying element, an operational sensor positioned within the housing, wherein the operational sensor is configured to output a sensor signal indicative of a measured operational parameter of the breather, and an expansion pack coupleable to the housing, the expansion pack configured to receive the sensor signal indicative of the measured operational parameter and to transmit at least one of the measured operational parameter or a representation thereof. The system further includes a control unit communicatively coupleable to the expansion pack, the control unit including a processor, a display unit, and a storage, the processor configured to execute a control application stored in the storage and configured to receive the at least one of the measured operational parameter or representation thereof.

The system may communicatively couple to the expansion pack via at least one wireless communication path. The display unit may display at least one of an end of life parameter or an operational characteristic of the breather based at least in part upon the sensor signal. The control unit may include a controller configured to perform one or more operations upon the received at least one of the measured operational parameter or representation thereof, to determine at least one of an end of life parameter or an operational characteristic of the breather based at least in part upon a result of the one or more operation upon the received at least one of the measured operational parameter or representation thereof, and to output a visual indication of the determined at least one of the end of life parameter or the operational characteristic of the breather via the display unit. The breather may include a plurality of operational sensors each coupleable to the expansion pack when the expansion pack is coupled to the breather.

The plurality of operational sensors may include a temperature sensor configured to measure a temperature of an inside of the housing adjacent to the temperature sensor, a first humidity sensor configured to measure a first humidity level adjacent to a location of the first humidity sensor within the housing, and a second humidity sensor configured to measure a second humidity level adjacent to a location of the second humidity sensor within the housing. The expansion pack may wirelessly transmit each of a representation of an output of the temperature sensor, a representation of an output of the first humidity sensor, and a representation of an output of the second humidity sensor. The controller may determine at least one end of life parameter based at least in part upon one or more of the output of the temperature sensor, the output of the first humidity sensor, and the output of the second humidity sensor. The controller may transmit a representation of the determined at least one end of life parameter to the control unit, the control unit may display at least one of an end of life parameter or an operational characteristic of the breather based at least in part upon the one or more of the output of the temperature sensor, the output of the first humidity sensor, and the output of the second humidity sensor.

Numerous other objects, features, and advantages of the present invention will be readily apparent to those skilled in the art upon a reading of the following disclosure when taken in conjunction with the accompanying drawings.

BRIEF DESCRIPTION OF THE SEVERAL VIEWS OF THE DRAWINGS

FIG. 11 includes both FIGS. 11A and 11B, which when combined provide a flowchart illustrating an exemplary process for determining a life of a breather according to aspects of the present disclosure.

FIG. 11A provides a first portion of a flowchart illustrating an exemplary process for determining a life of a breather according to aspects of the present disclosure.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
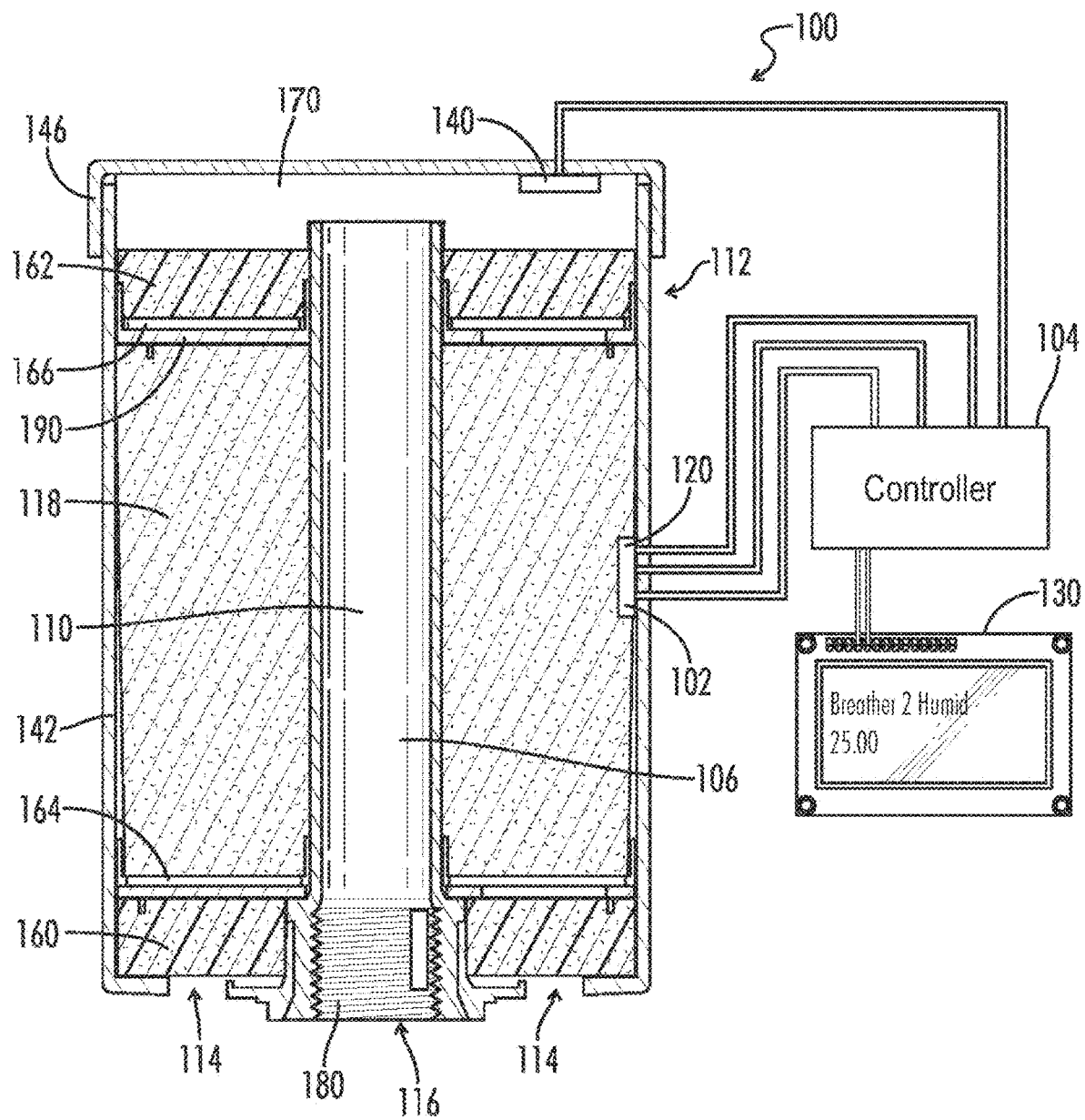
FIG. 1 is a side cutaway view of a breather having a humidity sensor.

Referring to FIG. 1, a breather 100 for a reservoir includes a housing 112, a first opening in the housing 114, a second opening in the housing 116, a dehumidifying element 118, a humidity sensor 102, and a controller 104. The first opening in the housing 114 is configured to be in fluid communication with air outside of the reservoir. The second opening in the housing is configured to be in fluid communication with air inside the reservoir. In various embodiments, the reservoir may include a head space of an asset coupleable to the breather 100.

The dehumidifying element 118 is positioned within the housing 112 such that air passing through the breather 100 from the outside to the inside of the reservoir or from the inside to the outside of the reservoir must pass through the dehumidifying element 118. The dehumidifying element 118 may include one or more of a desiccant, a deliquescent, a surface configured to provide drying, or any other dehumidifying element or compound.

The humidity sensor 102 is positioned within the housing 112. The humidity sensor 102 is operable to provide a humidity signal indicative of the humidity level adjacent the humidity sensor 102. In one embodiment, the breather 100 further includes a temperature sensor 120 associated with (e.g., positioned in or near) the housing 112. In one embodiment, the humidity sensor 102 is integral with the temperature sensor 120. The temperature sensor 120 is also electrically connected to the controller 104, and the temperature sensor 120 is operable to provide a temperature signal indicative of a temperature adjacent the temperature sensor 120 to the controller 104.

The controller 104 is electrically connected to the humidity sensor 102. The controller 104 may be local to the housing 112 or remote from the housing 112. The controller 104 may be electrically connected to the humidity sensor 102 via a wired or wireless communications link. The communications link may be analog or digital. The controller 104 is operable to determine an end-of-life condition of the breather 100 as a function of the humidity signal received from the humidity sensor 102. In one embodiment, the controller 104 is operable to determine the end-of-life condition as a function of the humidity signal received from the humidity sensor 102 and the temperature sensor received from the temperature sensor 120. The controller 104 uses the temperature signal and the humidity signal to determine a relative humidity associated with the dehumidifying element 118. In actual usage, the relative humidity stabilizes after initial installation of the breather 100 on the reservoir at approximately 20 to 25%, and the breather 100 reaches the end of its useful life when the relative humidity reaches 40%. In one embodiment, the controller 104 is operable to determine an estimated time of life remaining or an estimated percentage of life remaining as a function of the determined relative humidity and a historical rate of change of the relative humidity calculated by the controller based on previous relative humidity calculations. In various embodiments, a direct correlation between a head space temperature and/or humidity of an asset coupled to the breather 100 and a measured temperature and/or humidity by a sensor of the breather 100 at a top layer of the dehumidifying element 118. When measured in this manner, there may be a lag between an actual temperature or humidity measured and the measured temperature or humidity. However, this delay and/or a predicted value may be calculated in various embodiments to interpret sensor data as close as possible to actual data.

In one embodiment, the breather 100 further includes a display 130. The display 130 is electrically connected to the controller 104. The display 130 may be local to the controller 104 or remote from the controller 104. The electrical connection between the display 130 and the controller 104 may be wired or wireless, and may communicate data in an analog or digital format. The controller 104 is operable to provide an end-of-life signal indicative of the end-of-life status determined by the controller 104. The display 130 is operable to receive the end-of-life signal from the controller 104 and display to an observer an indication of the end-of-life status of the breather 100 as a function of the received end-of-life signal. The end-of-life signal is indicative of at least one of a relative humidity value, a percentage of life remaining, and an estimated remaining time of life. The end-of-life status displayed by the display 130 includes the at least one relative humidity value, percentage of life remaining, or estimated remaining time of life indicated by the end-of-life signal provided by the controller 104.

In one embodiment, the breather 100 further includes a pressure sensor 140. The pressure sensor 140 is positioned within the housing 112 such that air passing through the breather 100 from the inside of the reservoir to the dehumidifying element 118 must pass by the pressure sensor 140. The pressure sensor 140 is operable to provide a pressure signal indicative of an air pressure adjacent the pressure sensor 140 to the controller 104. The controller 104 is further configured to determine a fall condition when the pressure signal indicates that the air pressure adjacent the presser sensor 140 is above a predetermined pressure limit. In operation, when this pressure is above the predetermined limit, the breather 100 is defective, or the airflow requirements of the reservoir have not been properly matched to an appropriately sized breather (i.e., a larger capacity breather should be used with the given reservoir). In one embodiment, the pressure sensor 140 is a differential pressure sensor comprising a first pressure sensor in fluid communication with the air inside the reservoir and a second pressure sensor in fluid communication with the air outside the reservoir. In this embodiment, when the differential pressure sensed by the pressure sensor 140 exceeds a predetermined limit, the controller 104 is operable to determine the fault condition and communicate the fault condition to the display 130 for display to an observer. In various exemplary embodiments, a pressure sensor 140 may be optionally excluded from the breather 100, and one or more associated sensor values may be calculated, determined, predicted, or omitted.

In one embodiment, the housing 112 includes a polycarbonate body 142, vent plugs 144 at the first opening 114, and a cap 146. The breather 100 has a foam bottom 160, a foam top 162, a polyester filter bottom 164, a polyester filter top 166, and a filter ring 190. A space between the foam top 162 and cap 146 defines a breather headspace 170. The foam top 162 is between the dehumidifying element 118 and cap 146. The breather 100 includes a standpipe 110. The standpipe 110 has a standpipe bottom end 106 and a stand standpipe top end 108. The standpipe bottom end 106 includes a threaded section 180 operable to engage corresponding threads of the reservoir. In one embodiment, as shown in FIG. 1, the humidity sensor 102 is substantially surrounded by the dehumidifying element 118. That is, the humidity sensor 102 is located within the dehumidifying element 118. In another embodiment, the humidity sensor 102 is located within the breather cap headspace 170 of the breather 100. In one embodiment, the pressure sensor 140 is also included located within the breather cap headspace 170. In another embodiment, the humidity sensor 102 is located within the standpipe 110. It is contemplated that the humidity sensor 102 may be located within the dehumidifying element 118, partially within dehumidifying element 118 on the second opening 116 side of the dehumidifying element 118 such that air has to flow past the humidity sensor 102 as it passes between the dehumidifying element 118 and the second opening 116, or outside of the dehumidifying element 118 on the second opening 116 side of the dehumidifying element 118 such that air has to flow past the humidity sensor 102 as it passes between the dehumidifying element 118 and the second opening 116. It is contemplated within the scope of the claims that the breather 100 may include any number of first openings 114 and any number of second openings 116. In embodiment, the first opening(s) 114 includes a 2 way, pressure limited check valve. The check valve reduces exposure of the dehumidifying element 118 to the atmosphere to prolong the useful life of the dehumidifying element 118 and thus breather 100. The pressure limit prevents small fluctuations in pressure in the reservoir from drawing air through the dehumidifying element 118 while allowing larger, less transient pressure changes to draw air through the dehumidifying element 118 and maintain the proper pressure in the reservoir (e.g., approximately atmospheric or environmental pressure). In one embodiment, the check valve is limited at 0.2 psi in either direction.

During out-breathing, as moisturized air from the reservoir headspace enters the standpipe bottom side 106 and flows upward in to the breather headspace 170. The air then passes through the foam filter top 162 and polyester filter 166 to remove the dust particles over 3 microns out of the air. The air then passes through the dehumidifying element 118 where moisture gets absorbed from the air.

During in-breathing, breather 100 draws air from the surrounding space in through the first opening 114. This air first comes through the bottom foam filter 160, then the bottom polyester filter 164 where particles over 3 microns are removed. The air then passes through the dehumidifying element 118 where moisture is absorbed by the dehumidifying element 118, and clean, dry air enters in to the top side of standpipe 108, where it can flow into the reservoir headspace.

In one embodiment, the initial installation of the breather 100 on the reservoir includes removing the breather 100 from packaging, attaching the breather 102 threads of the reservoir corresponding to the threaded portion 180 of the standpipe 110, and providing power to the controller 104. Following initial installation, as dehumidifying element 118 absorbs moisture from the reservoir headspace and relative humidity in the reservoir headspace and breather 100 decrease. In one embodiment, the controller 104 is configured to ignore the humidity signal from the humidity sensor 102 until the humidity signal indicates that the humidity level adjacent the humidity sensor 102 has decreased below a predetermined maximum humidity level. In one embodiment, the predetermined maximum humidity level is a relative humidity level, and the controller 104 determines that the humidity level adjacent the humidity sensor 102 has decreased below the predetermined maximum humidity level as a function of both the temperature signal provided by the temperature sensor 120 and the humidity signal provided by the humidity sensor 102. In another embodiment, the controller one of four is configured to ignore the humidity signal for a predetermined period of time after initial installation of the breather 100 on the reservoir to allow the humidity adjacent the humidity sensor 102 to drop below the predetermined maximum humidity level. As continuous in-breathing and out-breathing of the air continues, dehumidifying element 118 gradually reaches its full saturation capacity and will no longer absorb the moisture out of the air passing therethrough. This allows moisturized air pass through and flow in and out of the tank headspace if the breather 100 is not replaced.

Figure 2:
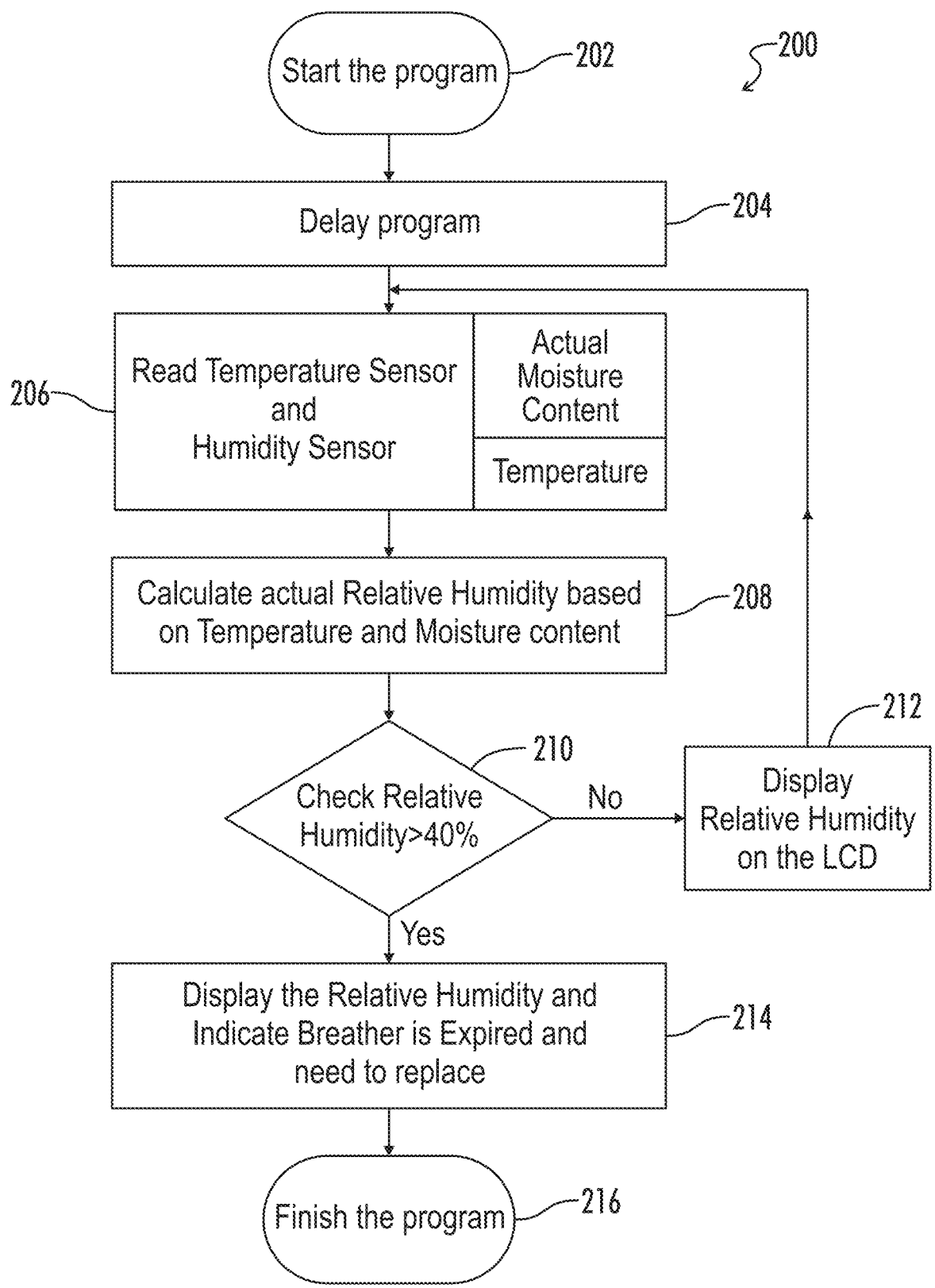
FIG. 2 is a flow chart of a method of determining an end of life condition of a breather.

Referring to FIG. 2, a method 200 of determining an end-of-life condition of the breather 100 begins at 202 when the controller 104 receives power. At 204, the control delays program as a function of time or a calculator relative humidity as described above to allow the humidity inside the breather 100 to stabilize. In one embodiment, the controller 104 delays the start of the humidity sensor monitoring cycle for 30 minutes. At 206, the controller 104 reads the temperature sensor 120 and the humidity sensor 102. At 208, the controller 104 calculates the actual relative humidity in the breather 100 based on the data read from the temperature sensor 120 and the humidity sensor 102. At 210, the controller 104 determines whether the relative humidity is greater than 40%. If the controller determines that the relative humidity is not greater than 40%, then the controller 104 provides the relative humidity to the display 130 (e.g., an LCD display) for display to an observer and again samples the temperature sensor 120 and the humidity sensor 102 at 206. If the controller 104 determines that the relative humidity is greater than 40% at 210, then the controller 104 senses the relative humidity to the display 134 display to an observer at 214. At 214, the controller 104 may also set an alarm or provide additional input to the display 130 indicating that the breather 100 has reached the end of its useful life. The method ends at 216 when the controller 104 ceases to receive power. Although described with reference to a value of 40%, it should be appreciated that the relative humidity threshold may be any specified, predetermined, or dynamically determined relative humidity percentage, either obtained from a user, stored or obtained by the controller 104, or a combination thereof.

It is contemplated that the breather 100 disclosed herein may be used with reservoirs containing lubricating oils, hydraulic fluids, and special chemicals to protect those contents from moisture and particulate ingestion under virtually any condition in any application. It is also contemplated that the dehumidifying element 118 may include Silica Gel (All Varieties); Activated Alumina; Molecular Sieve (All Varieties); Activated Carbon/Charcoal (All Varieties); Alumino Silcate gels: KC-Trockenperlen® N, KC-Trockenperlen® WS; Calcium Sulfate; ZR gel Grain (ZR, TI); Sodium Polyacrylate; Hygroscopic salts/deliquescent salts; and Glycols, or any combination thereof. Furthermore, the dehumidifying element 118 may include a deliquescent. In one embodiment, electronic components (e.g., the controller 104 and display 130) are encapsulated in moisture impermeable material (e.g., epoxy resin) to avoid particle contamination and premature failure.

Figure 3:
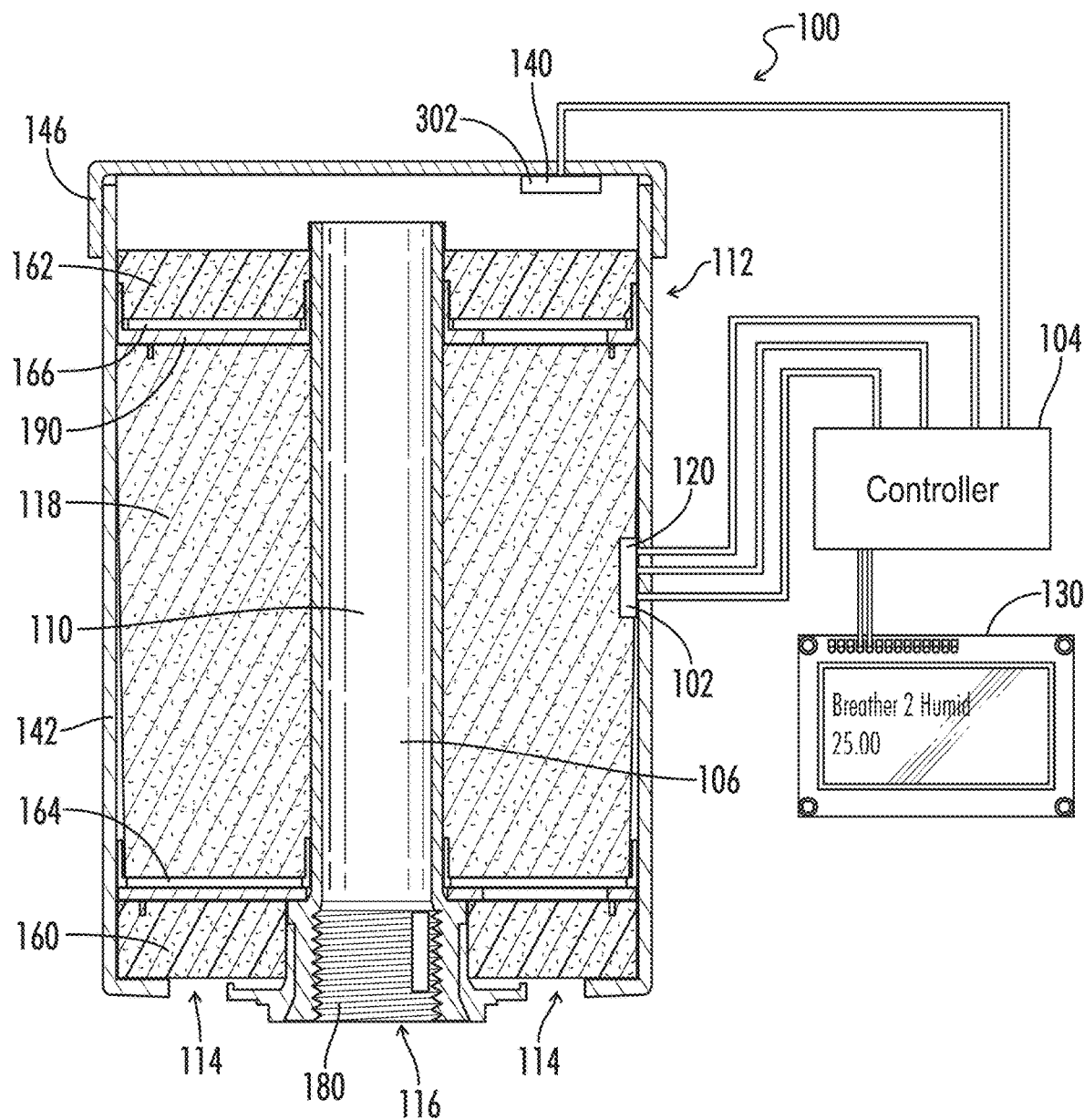
FIG. 3 is a side cutaway view of a breather having dual humidity sensors.

Referring to FIG. 3, in one embodiment, the breather 100 includes dual humidity sensors. The humidity sensor 102 is a first humidity sensor 102 positioned within the housing 112 and substantially surrounded by the dehumidifying element 118. The first humidity sensor 102 is operable to provide a first humidity signal indicative of a first humidity level adjacent the first humidity sensor 102 to the controller 104.

A second humidity sensor 302 may be integral with the pressure sensor 140 and position within the housing 112 such that air passing through the breather 100 from the inside of the reservoir to the dehumidifying element 118 and vice versa must pass by the second humidity sensor 302. The second humidity sensor 302 is operable to provide a second humidity signal indicative of a second humidity level adjacent the second humidity sensor to the controller 104. It is contemplated within the scope of the claims that the second humidity sensor 302 may be located within a thread adapter for adapting the threads of the threaded portion or section 180 of the housing 112 to threads of a corresponding section of the reservoir. In such an embodiment, the housing 112 is considered to include the thread adapter.

The controller 104 is electrically connected to both the first humidity sensor 102 and the second humidity sensor 302. The controller is operable to receive the first humidity signal from the first humidity sensor 102 and the second humidity signal from the second humidity sensor 302. The controller 104 is operable to determine an end of life condition of the breather 100 as a function of the first humidity signal and the second humidity signal. When the first humidity level indicated by the first humidity signal is approximately equal to or greater than the second humidity level indicated by the second humidity signal, the controller 104 operates normally as described above to determine the end of life condition by determining the relative humidity associated with the first humidity sensor 102.

In one embodiment, when the first humidity level indicated by the first humidity signal is less than the second humidity level indicated by the second humidity signal, the controller 104 can determine a fault condition. The first humidity level being less than the second humidity level indicates that the reservoir has not dried completely (i.e., the relative humidity at the second humidity sensor 302 is still trending downward after initial installation of the breather 100 on the reservoir) or that moisture is getting into the reservoir in some way.

In one embodiment, the controller 104 differentiates between initial installation and moisture penetration into the reservoir as a function of the rate of decrease of the relative humidity at the second humidity sensor 302 and the time after initial installation (i.e. power up of the controller 104). That is, if the rate of decrease of the relative humidity of the second humidity sensor 302 decreases without a corresponding increase in the humidity at the first humidity sensor 102, then the controller 104 determines that there is water intrusion into the reservoir. In this embodiment, the controller 104 only determines the fault condition when the controller 104 determines that there is water intrusion into the reservoir.

In one embodiment, the determined end of life condition is another fault condition. The controller 104 determines a dewpoint as a function of the pressure signal from the pressure sensor 140 and the temperature signal from the temperature sensor 120. When the second humidity level adjacent the second humidity sensor 302 indicates that the second humidity level is greater than the dewpoint, the controller 104 determines the fault condition. In one embodiment, the controller 104 is operable to transmit fault conditions (i.e., end-of-life conditions) to remote terminals or displays 130.

Figure 4:
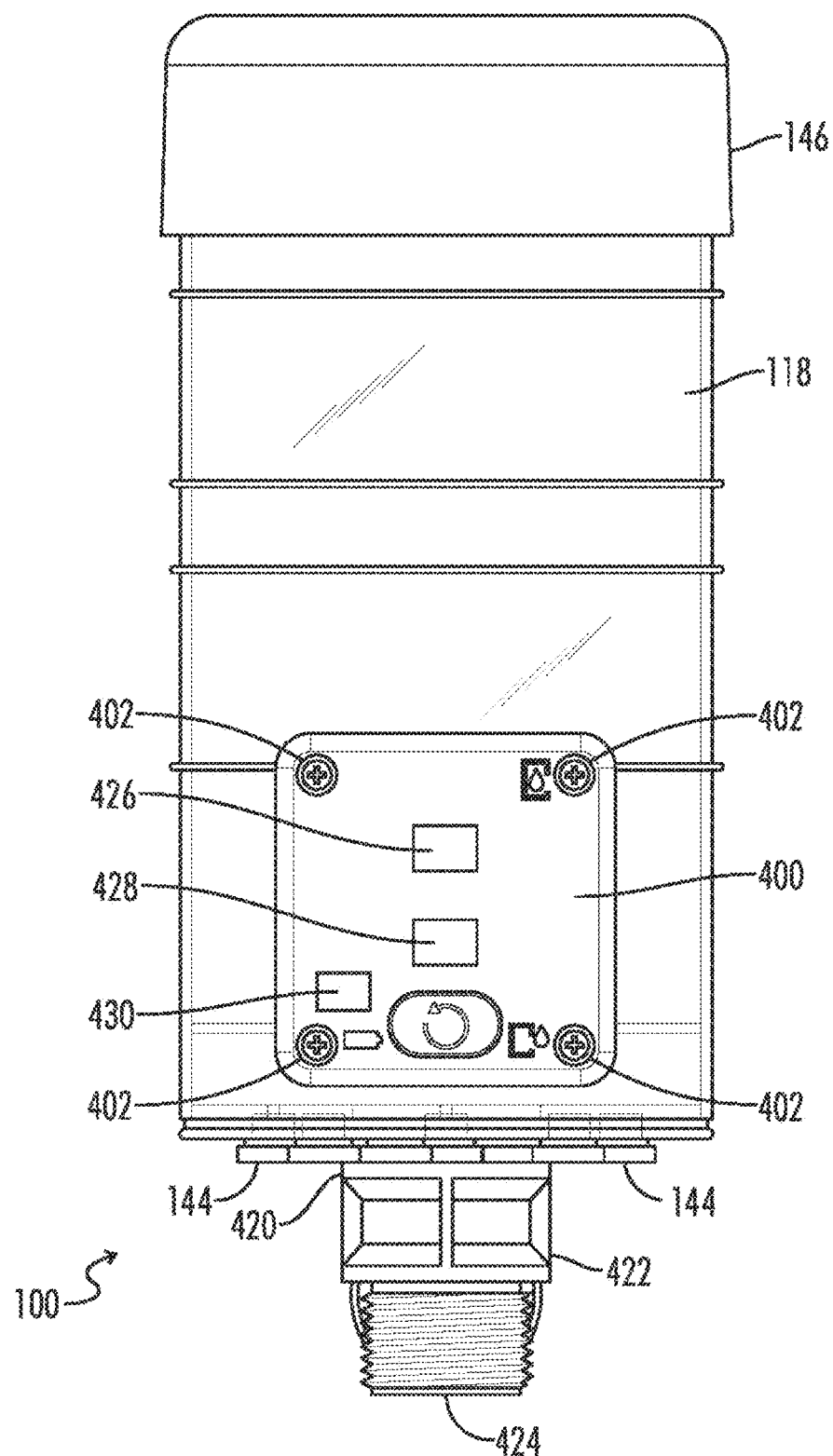
FIG. 4 illustrates a front view of an exemplary embodiment of a breather having an external pack.

FIG. 4 illustrates a front view of an exemplary embodiment of a breather 100 having an external pack 400 (e.g., an expansion pack). The external pack 400 optionally includes at least one mounting location 402. The mounting location 402 may be fixedly and/or removably coupleable to the breather 100. In various embodiments, one or more mounting locations 402 may include a mounting screw, bracket, tactile element, conductive material, communicative element, or any other means of physically and/or communicatively coupling the external pack 400 to the breather 100 (e.g., at housing 112 thereof). Although illustrated and described as being part of the external pack 400, it should be appreciated that at least one of the mounting locations 402 may be a part of or otherwise associated with the housing 112 (e.g., as a fixed or removable protrusion or inlet). In various embodiments, at least a portion of the external pack 400 may be contained within a portion of the breather 100, may be external to the breather 100, or any combination thereof. Accordingly, one or more external packs 400 may be configured as a part of a breather 100, may be physically and/or communicatively coupleable with a breather 100, may be partially contained within a breather 100, and/or may be entirely external to a breather 100. For example, in various embodiments a breather 100 may include at a portion of an external pack 400 relating to radio frequency communications which is configured as a part of a breather 100 to be used in the manner described herein.

The external pack 400 may include at least one controller 426. One or more of the at least one controller 426 may include one or more elements configured to perform at least one function of the controller 104. Additionally or alternatively, the at least one controller 426 may be configured to transmit and/or receive one or more signals associated with the controller 104. For example, in various embodiments, the at least one controller 426 may be configured to communicatively couple to one or more external elements configured to perform at least one operation corresponding to the controller 104 (e.g., via a client-server configuration, a distributed computing environment, a cloud computing environment, or any other processing configuration capable of performing one or more operations performed by and/or corresponding to the controller 104. The external pack 400 may include a power module 428. The power module 428 may be configured to receive at least one of an alternating current (AC) and/or direct current (DC) power input, or any other source of powering at least a portion of the external pack 400 or operations associated therewith.

The external pack 400 may include a communication module 430. The communication module 430 may be configured to at least one of a sensor associated with the breather 100 and/or an external control unit. The communication module 430 may be coupled to at least one sensor of the breather 100 and may be configured to transmit and/or receive at least one corresponding signal to/from the control unit. The communication module 430 may include one or more wired and/or wireless elements configured to transmit and/or receive one or more signals between the external pack 400 and one or more sensor and/or control unit. The communication module 430 may be configured to variously communicate with one or more wired or wireless elements via one or more communication protocols. For example, the communication module 430 may be configured to communicate with at least one element using a proprietary and/or standard protocol, such as Bluetooth, Bluetooth Low Energy (BLE), ZigBee, Z-Wave, 6LoWPAN, Thread, various IEEE 802.11 standards, cellular communication protocol (e.g., GSM, TDMA, GPRS, LTE, 3G, 4G, 5G, etc.), Near Field Communication (NFC), Radio frequency Identification (RFID), SigFox, LoRaWAN, Ingenu, ANT/ANT+, DigiMesh, MiWi, EnOcean, Dash7, WirelessHART, or any other wired or wireless communication protocol capable of sending and/or receiving one or more signals. In various exemplary embodiments, the communication module 430 may be configured to receive one or more sensor signal values from within the breather 100 via RFID and to transmit one or more associated signals via one or more wired and/or wireless communication mediums.

In one exemplary embodiment, the communication module 430 is configured to communicatively couple to at least one sensor associated with the breather 100 (e.g., at least one of humidity sensor 102, temperature sensor 120, and/or pressure sensor 140). The communication module 430 is optionally configured to communicate with at least one sensor via at least one wireless signal. The wireless signal may include a set of information packaged and/or communicated according to one or more communication protocol. In an exemplary embodiment, the communication module 430 is configured to communicate with at least one sensor via a wireless communication protocol. The wireless communication protocol is an RFID communication protocol in one exemplary embodiment. At least one of the communication module and the breather 100 or portion thereof may include an antenna or other signal interface configured to transmit and/or receive one or more signals.

Additionally or alternatively, the communication module 430 may be configured to be placed in physical electrical contact with at least one external or internal element of the breather 100 configured to convey one or more signals between the breather 100 and the communication module 430. In one exemplary embodiment, at least one sensor of the breather 100 and the communication module 430 may be configured to communicate according to a wired communication protocol, for example via one or more conductive wires or elements. Although described with reference to a wired communication protocol, it should be appreciated that a wired connection may include one or more wired, contacts, connectors, or any other physical element capable of transmitting and/or receiving at least one signal between at least one sensor of the breather 100 and the communication module 430. In various embodiments, at least a portion of the communications module 430 may be configured to be placed in contact with at least a portion of the breather 100, for example via a conductive probe or other element configured to convey at least one signal. Additionally or alternatively, the communication module 430 may include at least one conductive or communicative element configured to physically extend into the housing 112 of the breather 100 and/or to be placed in contact with a communicative and/or conduct element associated with at least one sensor of the breather 100.

The communication module 430 is optionally configured to perform one or more operations either directly upon or otherwise in association with at least one set of data communicated or intended to be communicated between the communication module 430 and at least one of the control unit and/or at least one sensor associated with the breather 100. For example, the communication module 430 may be configured to format and/or packetize at least a portion of data. At least one operation associated with the set of data may be performed, in whole or in part, in place of, in conjunction with, or directly by a controller of the external pack 400.

The communication module 430 is configured in one exemplary embodiment to communicate with the control unit wirelessly. For example, the communication module 430 may be configured to communicate with the control unit via at least one of an RFID protocol, Wi-Fi, Bluetooth, or any other wireless communication protocol. Additionally or alternatively, the communication module 430 may be configured to communicate at least one set of data to and/or from the control unit via one or more wired communication paths. In various embodiments, the communication module 430 includes at least one physical coupler (not illustrated) for receiving at least one wired or wireless coupler configured to enable communication between the communication module 430 and at least one of the control unit and/or at least one sensor.

The external pack 400 may include an operation module 404. In an exemplary embodiment, the operation module 404 includes a reset button configured to reset at least one operation of the external pack 400. The operation module 404 may be configured to perform one or more fixed and/or configurable operations of the external pack 400. For example, in one exemplary embodiment, the operation module 404 may control one or more operations including a power on/off command, a reset command, a programmable operation, and/or a predetermined operation associated with at least one of the breather 100 and/or the external pack 400.

The housing 112 may include a cap 146 coupleable thereto. The cap 146 may variously be fixedly or removably coupleable to the housing 112. The base 112 may have coupleable thereto an external connector 420. The external connector 420 may be configured to enable coupling the breather 100 to at least one reservoir. A coupling housing 422 may be coupled to the external connector 420. A mounting element 424 may be coupled to at least one of the external connector 420 and/or the coupling housing 422. The mounting element 424 may optionally include a threaded portion or any other coupling means. The mounting element 424 may be configured to couple to at least one reservoir, either directly or indirectly.

Figure 5:
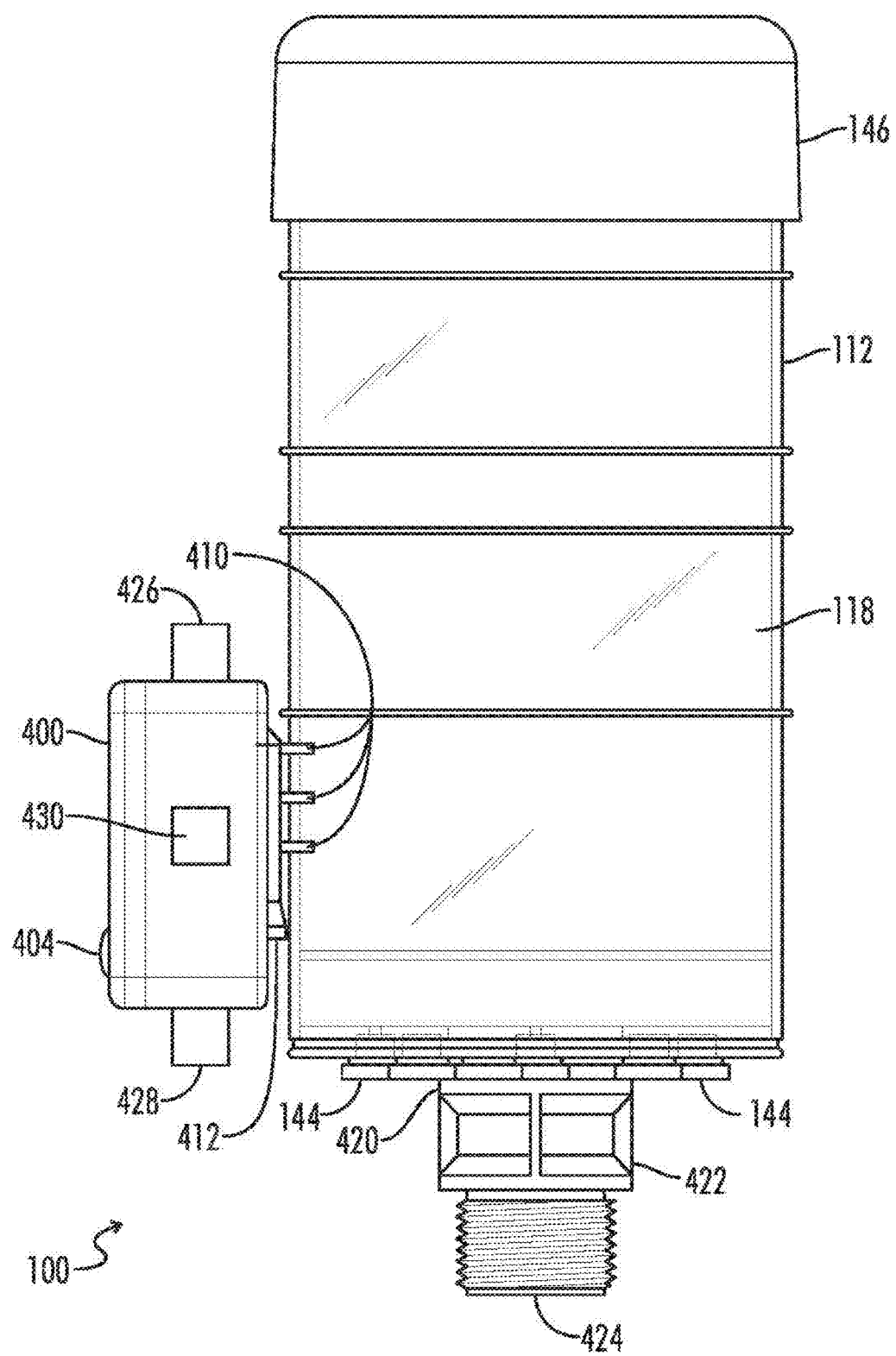
FIG. 5 illustrates a left side view of an exemplary embodiment of a breather having an external pack coupled thereto according to aspects of the present disclosure.

FIG. 5 illustrates a left side view of an exemplary embodiment of a breather 100 having an external pack 400 coupled thereto according to aspects of the present disclosure. The exemplary embodiment illustrated by FIG. 5 includes an external pack 400 coupled to the breather 100 via at least one connector 410. At least one connector 410 may include at least one of a physical and/or communicative coupling element configured to couple the external pack 400 and the breather 100. The connector 410 may include one or more conductive elements configured to transfer at least one signal between the breather 100 and the external pack 400. Although illustrated as a physical connection, it should be appreciated that one or more of the at least one connector 410 may be configured to transmit one or more signals from the breather 100 to the external pack 400 (and/or vice-versa) via at least one wireless or non-conductive communication means (e.g., via the communication module 430 as previously described herein). Although illustrated as having three connectors 410, any number of physically and/or communicatively coupleable connectors 410 may be implemented to communicate one or more signals between the breather 100 and the external pack 400.

Figure 6:
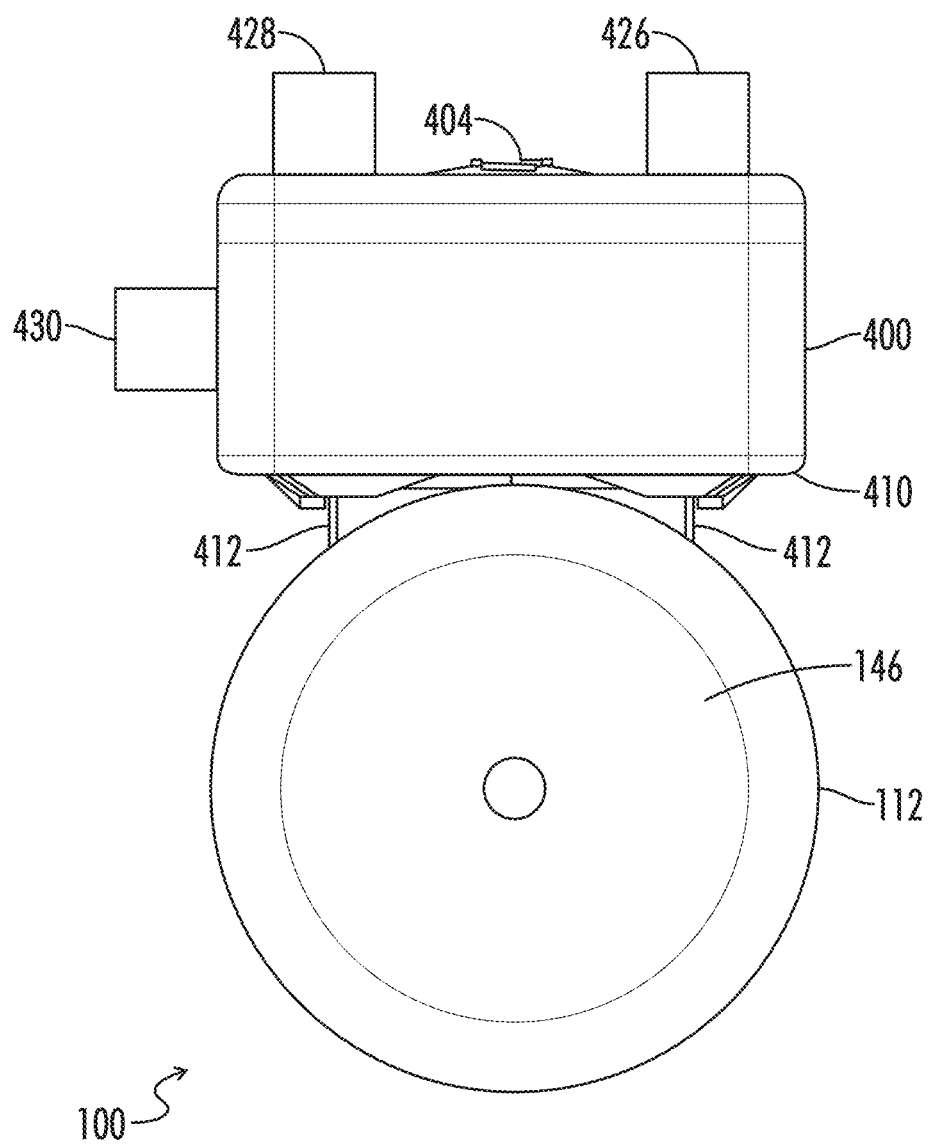
FIG. 6 illustrates a top view of an exemplary embodiment of a breather coupled to an external pack according to aspects of the present disclosure.

FIG. 6 illustrates a top view of an exemplary embodiment of a breather 100 coupled to an external pack 400 according to aspects of the present disclosure. The housing 112 of the breather 100 may be physically coupleable to the external pack 400 via one or more standoffs 412. At least one of the standoffs 412 may be configured to provide a physical coupling and/or separation between the housing 112 and the external pack 400. In various embodiments, at least one connector 410 may be implemented as at least one standoff 412 and/or may be included within at least one standoff 412. For example, in one exemplary embodiment, one or more standoff 412 may include therein, thereupon, or otherwise associated therewith at least one connector 410. At least one of a number, a spacing, and/or a location of at least one standoff 412 may be predetermined based at least in part upon a particular size, shape, or configuration of a breather 100. Similarly, at least a portion of the breather 100 may be configured according to a predetermined setting associated with at least one standoff 412.

Figure 7:
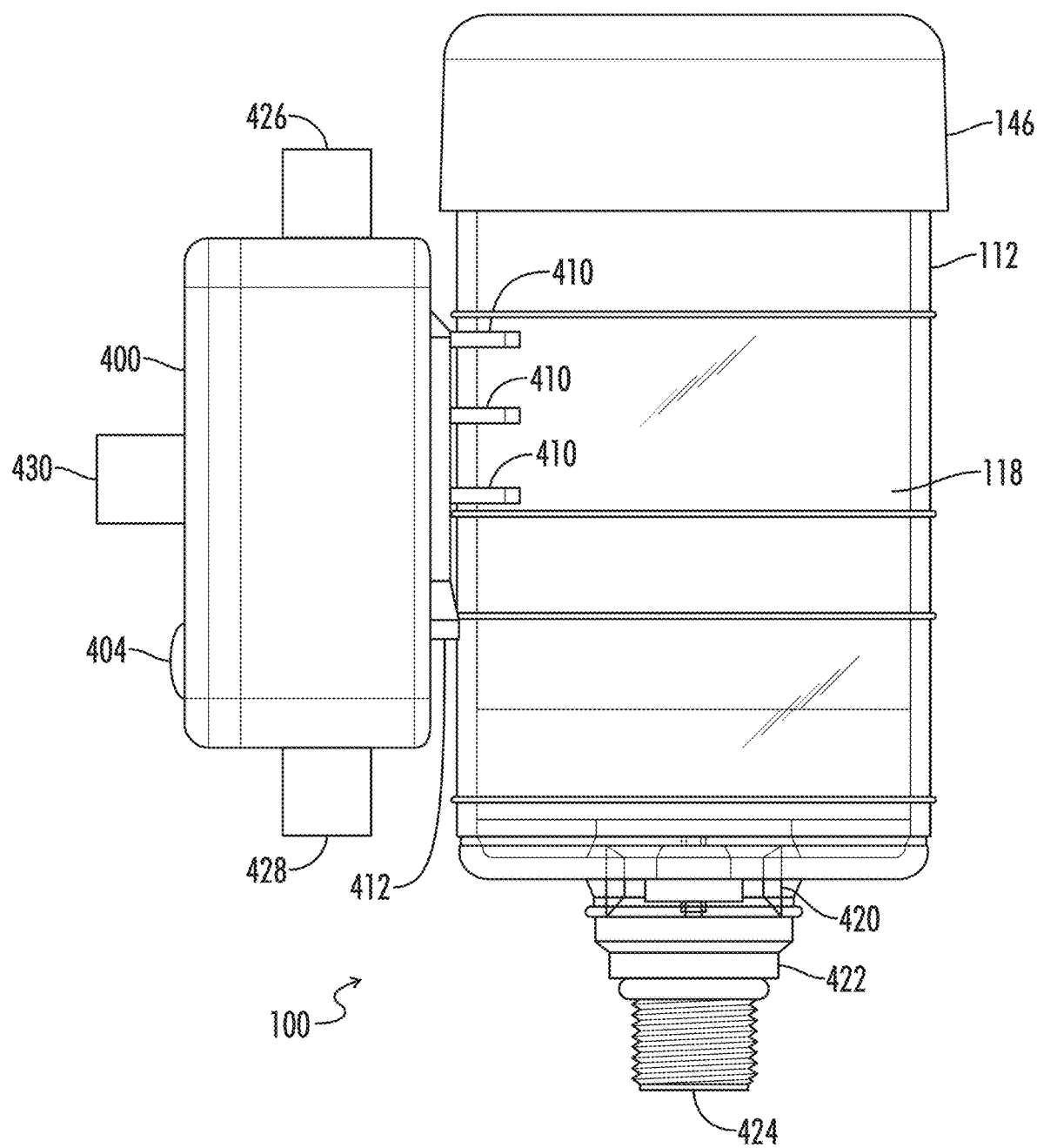
FIG. 7 illustrates a right side view of an exemplary embodiment of a decreased volume breather having an external pack coupled thereto at a middle portion thereof according to aspects of the present disclosure.

FIG. 7 illustrates a right side view of an exemplary embodiment of a decreased volume breather 100 having an external pack 400 coupled thereto at a middle portion thereof according to aspects of the present disclosure. In the exemplary embodiment illustrated by FIG. 7, the external pack 400 is coupled to the housing 112 of the breather 100 via plurality of connectors 410 and is further in contact with a standoff 412 associated with at least one of the housing 112 and the external pack 400.

Figure 8:
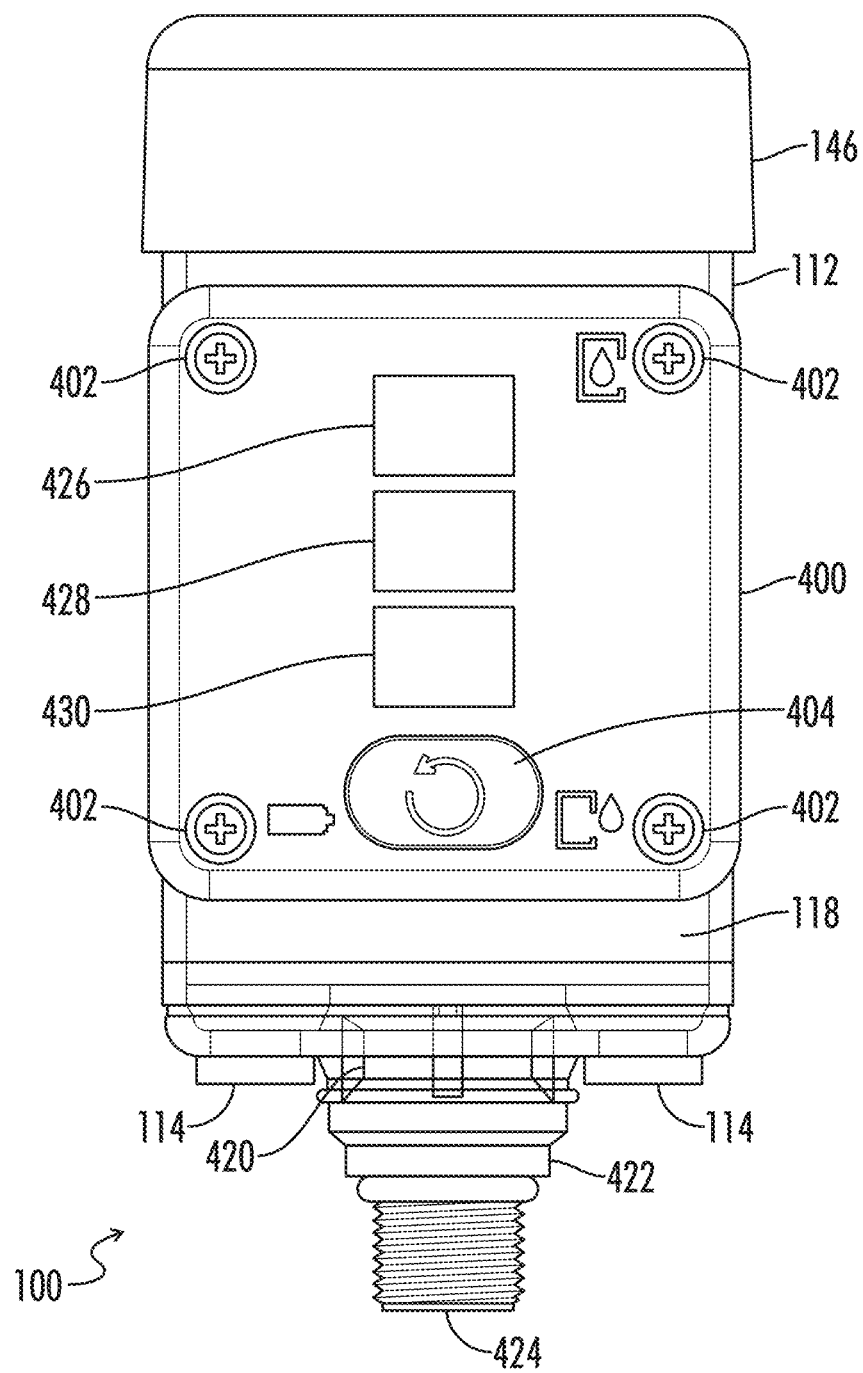
FIG. 8 illustrates a front view of an exemplary embodiment of the decreased volume breather having an external pack coupled thereto according aspects of the present disclosure.

FIG. 8 illustrates a front view of an exemplary embodiment of the decreased volume breather 100 having an external pack 400 coupled thereto according aspects of the present disclosure.

Figure 9:
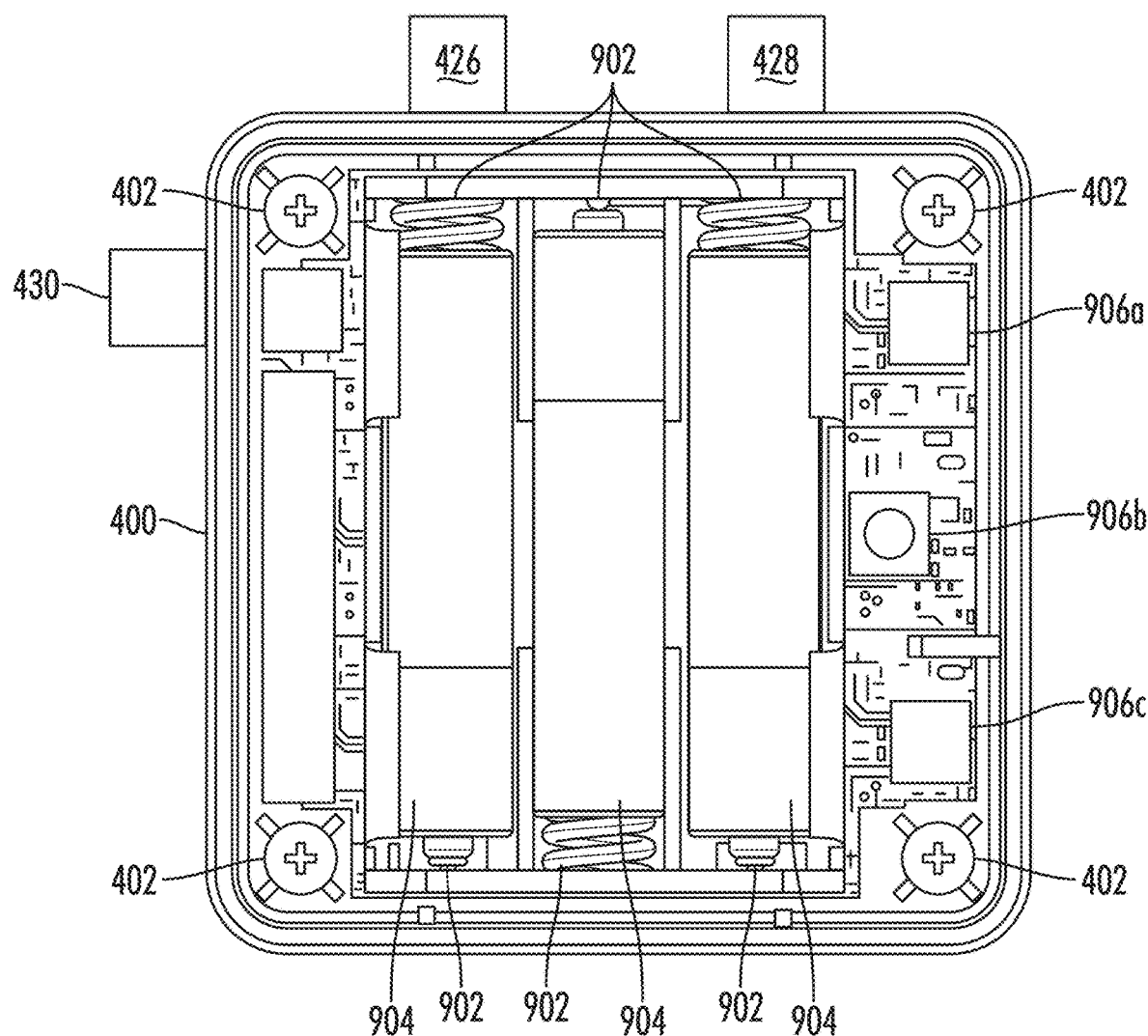
FIG. 9 illustrates an exemplary embodiment of a partial internal view of an external pack according to aspects of the present disclosure.

FIG. 9 illustrates an exemplary embodiment of a partial internal view of an external pack 400 according to aspects of the present disclosure. The external pack 400 may include at least one connector 902, at least one power source 904, and at least one circuit element 906a, 906b, and/or 906c. The external pack 400 may further include one or more of a mounting location 402, a controller 426, a power module 428, and/or a communication module 430. The at least one power source 904 may be placed in contact with one or more connector 902. In one exemplary embodiment the at least one power source 904 includes at least one battery. Additionally or alternatively, the external pack 400 may be configured to receive at least one of alternating current (AC) and/or direct current (DC) power via the power module 428. In various embodiments, the power module 428 may include one or more connections to an external power source and may optionally include at least one energy storage portion configured to store energy for powering at least a portion of the external pack 400 or element connected thereto. In an exemplary embodiment, the power module 428 may be coupled to a wired connection configured to provide both power and signaling. Additionally or alternatively, at least one of power and signaling may be provided by a combination of both wired and wireless connections. Communication between at least one sensor of a breather 100 and the external pack 400 may be performed using a wireless communication interface between the breather 100 and the external pack 400.

The external pack 400 may be configured to operate in a legacy/retrofit configuration, whereby sensors of a breather 100 may be coupled to a control module as described herein. In one exemplary embodiment, two or more external packs may be configured to communicate one or more sets of information via at least one of a wired and/or wireless communications interface therebetween. For example, the external pack 400 may be configured to communicate with at least one other external pack 400 and/or control module according to a wireless communication protocol such as Wi-Fi, Bluetooth, or any other communications medium or standard. Additionally or alternatively, at least one wired connection may be used for environments where wireless communication is inoperable or inefficient. One or more control protocols may be used for wired and/or wireless control and/or signaling associated with the external pack 400 including, for example, X10, A10, UPB, INSTEON, Z-Wave, ZigBee, or any other communication protocol.

In various embodiments, the external pack 400 may be configured to obtain and/or transmit at least one value corresponding to a sensor of the breather 100 at a regular interval. For example, the external pack 400 may be configured to receive and/or transmit at least one sensor value once per hour, once per minute, once per second, etc. In one exemplary embodiment, the interval value may be determined based at least upon an input power source. For example, the external pack 400 may be configured to obtain at least one sensor value at a more frequent interval when coupled to a wired power source than when operating on battery power.

At least one circuit element 906a, 906b, 906c may include one or more dedicated or shared portions for communicating with or regarding at least one of the breather 100 and/or the control unit, for controlling at least one operation of the breather 100 and/or the control unit, and/or for collecting and/or storing at least a portion of data corresponding to at least one of the breather 100 and/or the control unit.

Figure 10:
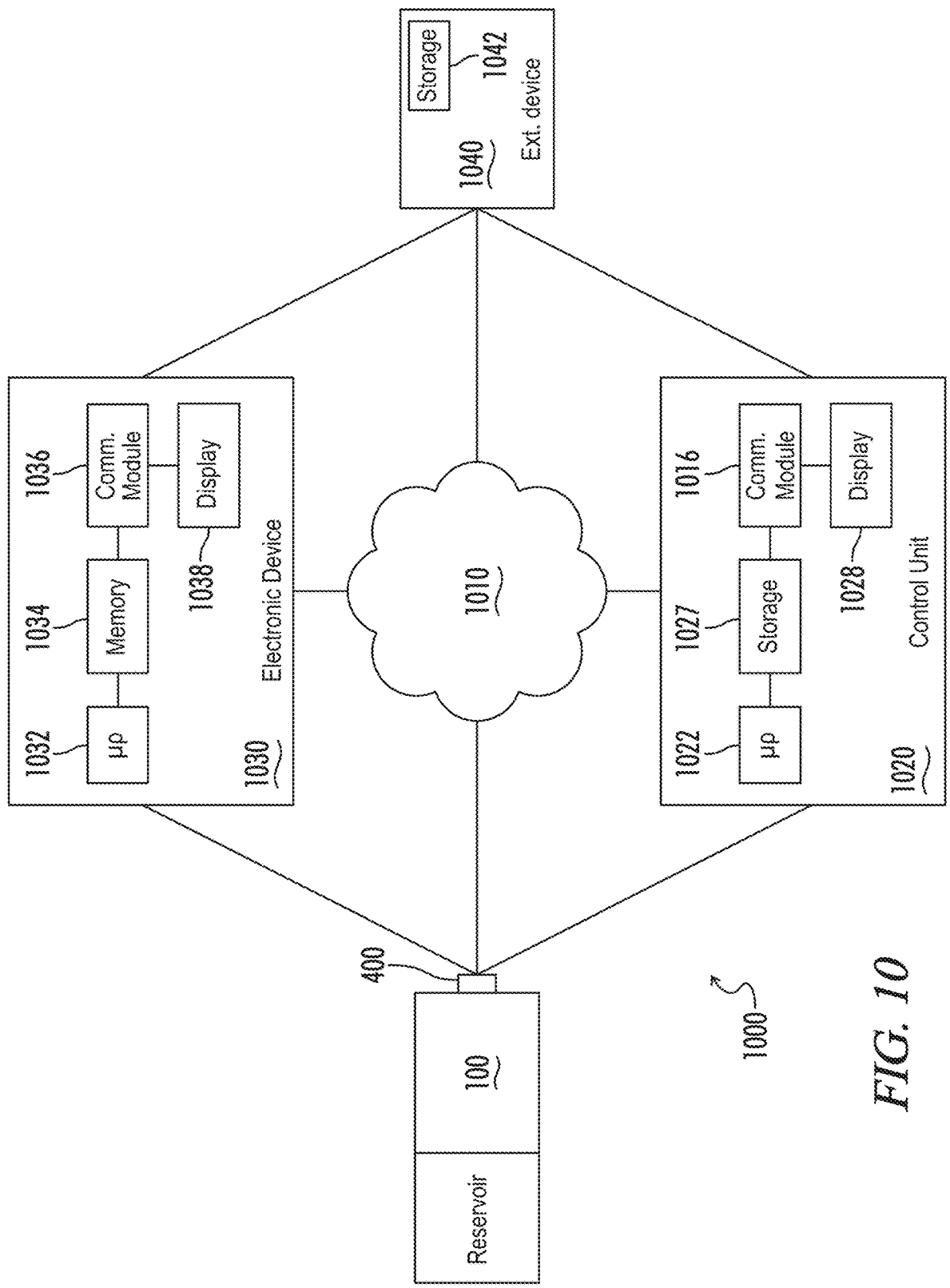
FIG. 10 illustrates a block diagram of an exemplary network configuration of a breather having an external pack coupled thereto and other electronic devices according to aspects of the present disclosure.

FIG. 10 illustrates a block diagram of an exemplary network configuration of a breather 100 having an external pack 400 coupled thereto and other electronic devices according to aspects of the present disclosure. The system 1000 includes a breather 100 coupled to a reservoir and further coupled to an external pack 400. The external pack 400 is configured to communicate with at least one of a network 1010, a control unit 1020, an electronic device 1030, and/or an external device 1040.

The control unit 1020 may be a computing device at a fixed location at or near the breather 100 and/or may be or otherwise include a mobile element capable of communicating with the external pack 400 by wired or wireless communication. In one exemplary embodiment, the control unit 1020 is a tablet computing device or mobile device capable of wirelessly communicating with the external pack 400, for example using an RFID communication protocol, a Bluetooth communication protocol, a Wi-Fi communication protocol, or any other wireless means of communicating information between the external pack 400 and the control unit 1020. In various embodiments, the control unit 1020 may be carried by a person, may be fixed to a mobile device such as a vehicle, and/or may be both configured to be transported by a mobile device and/or carried by a person. A distance at which the control unit 1020 may communicate with the external pack 400 may vary based at least in part upon a particular wireless communication protocol or network used. For example, a communicative range of an RFID protocol may be less than that of a Bluetooth range, which may in turn be less than that of a Wi-Fi range. The system 1000 may be configured such that any of one or a plurality of communication protocols may be selected for use based at least in part upon a signal strength, a trusted network identifier, a private network identifier, a user-based or automatic determination, or the like.

The control unit 1020 may be configured to communicate one or more signals relating to the breather 100 with the external pack 400. Communications between the control unit 1020 and the external pack 400 may be direct between the communication module 1026 of the control unit 1020 and the communication module 430 of the external pack 400 and/or at least a portion thereof may be communicated, in whole or in part, via the network 1010. The external pack 400 may be configured to obtain sensor data from the breather 100 (e.g., from one or more of a humidity sensor 102, a temperature sensor 120, and/or a pressure sensor 140) and to transmit the obtained sensor data or representation thereof to the control unit 1020.

In one exemplary embodiment, the network 1010 includes one or more of the Internet, a public network, a private network, or any other communications medium capable of conveying electronic communications. Connection between a communication module 1026 of the control unit 1020 and the network 1010 is configured to be performed by wired interface, wireless interface, or a combination thereof, without departing from the spirit and the scope of the present disclosure. In one exemplary operation, the control unit 1020 is configured to store one or more sets of instructions in a storage 1024. The one or more sets of instructions may be configured to be executed by a processor 1022 of the control unit 1020 to perform operations corresponding to the one or more sets of instructions.

In various exemplary embodiments, the control unit 1020 is implemented as at least one of a desktop computer, a laptop computer, a smart phone, or any other electronic device capable of executing instructions. The processor 1022 is configured to take the form of a generic hardware processor, a special-purpose hardware processor, or a combination thereof. In embodiments having a generic hardware processor (e.g., as a central processing unit (CPU) available from manufacturers such as Intel and AMD), the generic hardware processor is configured to be converted to a special-purpose processor by means of being programmed to execute and/or by executing a particular algorithm in the manner discussed herein for providing a specific operation or result.

The control unit 1020 is configured in various embodiments to be associated with a mobile user, and is capable of being transported, either during operation or while powered off. In one embodiment where the control unit 1020 is a cellular telephone or smartphone, the control unit 1020 is at least temporarily located at a location at or near the breather 100. In various embodiments, the control unit 1020 is configured to operate remotely, and is configured to obtain or otherwise operate upon one or more instructions stored physically remote from the control unit 1020 (e.g., via client-server communications and/or cloud-based computing).

The control unit 1020 may include a display unit 1028. The display unit 1028 is embodied within the control unit 1020 in one embodiment, and is configured to be either wired to or wirelessly-interfaced with the end user electronic device 200. The display unit 1020 may be configured to operate, at least in part, based upon one or more operations of the external pack 400 or controller associated therewith, as executed in whole or in part by the processor 1022. Although operable using the display unit 1022 of the control unit 1020, an application or interface associated with a user of the control unit 1020 may be capable of executing and operating using a plurality of devices. For example, one or more control units 1020 may include smart phones, tablets, laptop computers, etc., each having different processors 1022, screen resolutions, memory sizes, etc., but each may be capable of executing the a control application after download and/or installation of at least a portion of the control application received, for example, from the external device 1040.

The control unit 1020 may be configured to receive the sensor data or representation, to optionally perform one or more operations on the data, and to optionally present the data or representation, for example via the display unit 1028. A user of the control unit 1020 may be presented with one or more visual indicia relating to the sensor data or representation thereof via the display unit 1028 (for example, as illustrated by and described herein with reference to FIG. 14). A user of the control unit 1020 may review sensor data corresponding to the breather 100 and may selectively initiate, control, pause, or end one or more operations corresponding to the breather 100. A control application implemented by the control unit 1020 may be configured to detect or predict a breather life parameter based at least in part upon the obtained sensor data or representation thereof. The control application may be selectively configured to present an audio and/or visual indicator to a user of the control unit 1020 relating to at least one operational parameter of the breather 100 in association with at least apportion of the obtained sensor data or representation thereof. In various embodiments, the control application may present one or more charts, graphs, raw data, or other information to a user of the control unit 1020 to permit the user to monitor and/or control an actual or estimated life parameter associated with the breather 100.

The external device 1040 is configured to perform one or more operations corresponding to the control application. Although illustrated as a single element, the external device 1040 may be implemented as a plurality of computing elements, any of which may be located either within a single computing element or a plurality of computing elements. In one exemplary embodiment, the external device 1040 is configured to store at least a portion of an executable file, a portion of computer code, or other information associated with the control application at the storage 1042, such that at least a portion of data corresponding to the control application is transmitted from the external device 1040 to at least one of the control unit, the electronic device, and/or the external pack 400 via the network 1010. For example, the external device 1040 may perform one or more functions corresponding to an application store configured to provide an executable copy of the control application to a requesting entity, either automatically or in response to a download request.

The external device 1040 may, in one exemplary embodiment, include a storage 1042 configured to store at least a portion of data corresponding to the control application. In one embodiment, the at least a portion of data corresponding to the control application may include an executable or installable file for use by a downloading entity. Additionally or alternatively, the at least one portion of data may contain or embody a link or other association with at least one file located remotely from the external device 1040.

The system 1000 may further include at least one electronic device 1030. The electronic device 1030 may be configured to transmit and/or receive data corresponding to the breather 100 in various embodiments. The electronic device 1030 may include a storage 1034, configured to store at least one of computer instructions and/or data or metadata associated with the control application and/or breather 100. A processor 1032 of the electronic device 1030 is configured to execute one or more set of instructions in a manner similar to that described above with relation to processor 1022. The electronic device 1030 may further include a communication module 1036. The communication module 1036 may be configured to communicate via the network 1010, for example using at least one of a wired and/or wireless communication path. One or more of the memory 1034, the processor 1032, and the communication module 1036 may be coupled via a bus. The bus may be a conductive path in one exemplary embodiment, however any means of conveying at least a portion of a signal between two or more of the memory 1034, the processor 1032, and/or the communications module 1036 may be used as the bus without departing from the spirit and the scope of the present disclosure.

The electronic device 1030 may include a mobile electronic device associated with a user. For example, the electronic device 1030 may include a smartphone, laptop computer, tablet computer, or any other mobile computing device. The electronic device 1030 may be configured to store and/or execute at least a portion of the control application described above with reference to the control unit 1020. Like the control unit 1020, the electronic device 1030 may be configured to obtain at least a portion of a control application from the external device 1040.

At least one control unit 1020 may be associated with one or more external packs 400 while one or more electronic devices 1030 may be dynamically associable with one or more external packs 400. For example, one or more fixed-location control units 1020 may be placed in wireless proximity of one or more external packs (for example in a plant or factory having a plurality of breathers 100) for monitoring and/or controlling at least one operation of a breather 100, while at least one electronic device 1030 may be carried by a user and may be capable of monitoring and/or controlling at least one operation of a breather 100 while the electronic device 1030 is within wireless communication range of the breather 100. The control application may be configured in one embodiment to cause a control unit 1020 or electronic device 1030 executing the control application perform at least one of active and passive data collection relating to the breather 100. For example, the control application may be configured to operate in the background of the computing device executing the control application, for example at periodic or non-periodic times, and/or may be configured to constantly monitor at least one set of information relating to a breather 100 while the device operates in a passive mode, such as during standby or while in a sleep mode or while unattended by a user.

In various embodiments, at least a portion of obtained data relating to a breather 100 may be transmitted, in whole or in part, between a computing element having obtained at least a portion of data and one or more other computing elements external to the obtaining computing element, for example via the network 1010. At least a portion of data obtained at a computing device via the external device 400 may be automatically uploaded to at least one other computing element upon receipt and/or may be stored for transmission at a later time, for example at a predetermined time or upon the computing element obtaining network access capable of transmitting the obtained data (e.g., via the Internet and/or private network).

Figure 11B:
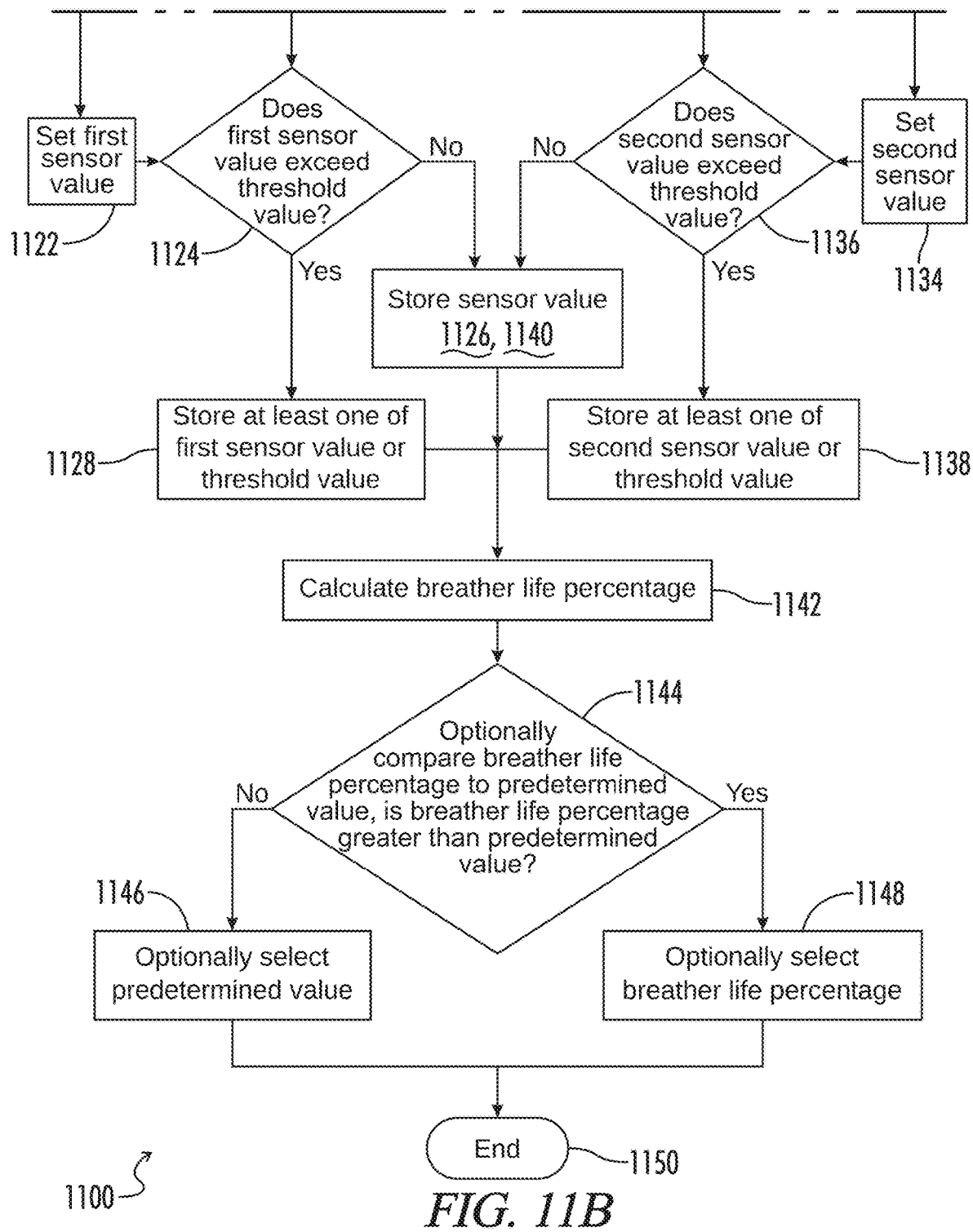
FIG. 11B provides a second portion of a flowchart illustrating an exemplary process for determining a life of a breather according to aspects of the present disclosure.

FIG. 11 includes FIGS. 11A and 11B, which together provide a flowchart illustrating an exemplary process 1100 for determining a life of a breather 100 according to aspects of the present disclosure. A breather 100 for use with the method 1100 may include a plurality of sensors placed in or otherwise communicatively coupleable to the breather 100, for example located at a top and a bottom layer of silica gel of the breather 100.

The process 1100 begins at a step 1102. At a step 1104 a value associated with an operational parameter of the breather 100 may be converted between units or unit types, if required (e.g., a temperature may be converted between units of measurement, a pressure may be converted between units of pressure, or any other manipulation of a number or type associated with an operational parameter of the breather 100). The process continues to a step 1106 where an optional data operation is performed on one or more values or sets of information relating to the breather 100 or to an operational parameter thereof. In one exemplary embodiment, the optional data operation may include an averaging operation.

At a step 1108, it is determined whether a first parameter associated with the breather 100 is within a tolerance. The tolerance may include any predetermined value, a dynamically determined value, or combination thereof. If it is determined that the first parameter is not within a tolerance range or value, the process continues to a step 1110 where it is determined whether the first parameter exceeds a maximum value. If it is determined at the step 1110 that the first parameter does not exceed the maximum value, the process continues to a step 1112 where a threshold value is set. The threshold value may be a predetermined value, a dynamically determined value, or combination thereof, and may be based at least in part upon the value of the first parameter or a representation thereof. Similarly, if it is determined at the step 1110 that the first parameter exceeds the maximum value, a threshold value may be set at the step 1114. Although illustrated with reference to a same block 1112/1114, it should be appreciated that the steps 1112 and 1114 may be implemented by applying different threshold values compared to one another, each based at least in part upon the first parameter value, the tolerance value, a value associated with the breather 100, or a combination thereof. The process then continues to both steps 1118 and 1130. If it is determined at the step 1108 that the first parameter is within the tolerance range or value, the process continues to a step 1116 where the threshold value is determined, for example using one or more values associated with one or more of the plurality of sensors.

The process then continues to the step 1118, where an optional data operation is performed in relation to at least one value or operational parameter associated with at least one of the plurality of sensors. The process continues to a step 1120 where it is determined if an obtained first sensor value is within an acceptable range. If it is determined that the value of the first sensor value is within the acceptable range, the process continues to a step 1124. If it is determined that the value of the first sensor value is not within the acceptable range, the process continues to a step 1122 where the first sensor value is set. The process then continues to the step 1124 where it is determined whether the first sensor value exceeds a threshold value. If the first sensor value exceeds the threshold value, at least one of the first sensor value or the threshold value is stored or otherwise obtained at a step 1128 and the process continues to a step 1142. If the first sensor value does not exceed the threshold value, the first sensor value is stored or otherwise obtained at a step 1126 and the process continues to the step 1142.

Concurrent with, prior to, or after step 1118 is performed, the step 1130 may be performed, whereby an optional data operation is performed in relation to at least one value or operational parameter associated with at least one of the plurality of sensors. The process continues to a step 1132 where it is determined if an obtained second sensor value is within an acceptable range or value. The second sensor value may be a second measured value of a same of the plurality of sensors and/or may include a measurement or parameter associated with a second sensor of the plurality of sensors. If the obtained second sensor value is within the acceptable range or value, the process continues to a step 1136. If it is determined at step 1132 that the obtained second sensor value is not within the acceptable range or value, the process continues to a step 1134 where the second sensor value may be set and/or otherwise obtained. The process then continues to the step 1136 where it is determined whether the second sensor value exceeds a threshold value. In various embodiments, the threshold value addressed at the step 1136 may be the same as or different from the threshold value of the step 1124. If the second sensor value exceeds the threshold value, at least one of the second sensor value or the threshold value may be stored or otherwise obtained at a step 1138 and the process continues to a step 1142. If the second sensor value does not exceed the threshold value, the process may continue to a step 1140, where the sensor value is stored, and the process may continue to the step 1142.

At step 1142 the breather life percentage is calculated. The process then continues to a step 1144 where the calculated breather life percentage is optionally compared to a predetermined value. The predetermined value may be a value associated with at least one of the breather 100 and/or a component thereof. If it is determined at step 1144 that the current breather life percentage is greater than the predetermined value, the process continues to a step 1146 where the predetermined value may be selected (e.g., for presentation to a user and/or use in determining or otherwise operating in accordance with a breather life parameter or value). The process then ends at a step 1150. If, however, it is determined at the step 1144 that the breather life percentage is not greater than the predetermined value, the process continues to a step 1148 where the calculated breather life percentage is optionally selected. The process then ends at the step 1150.

Figure 12:
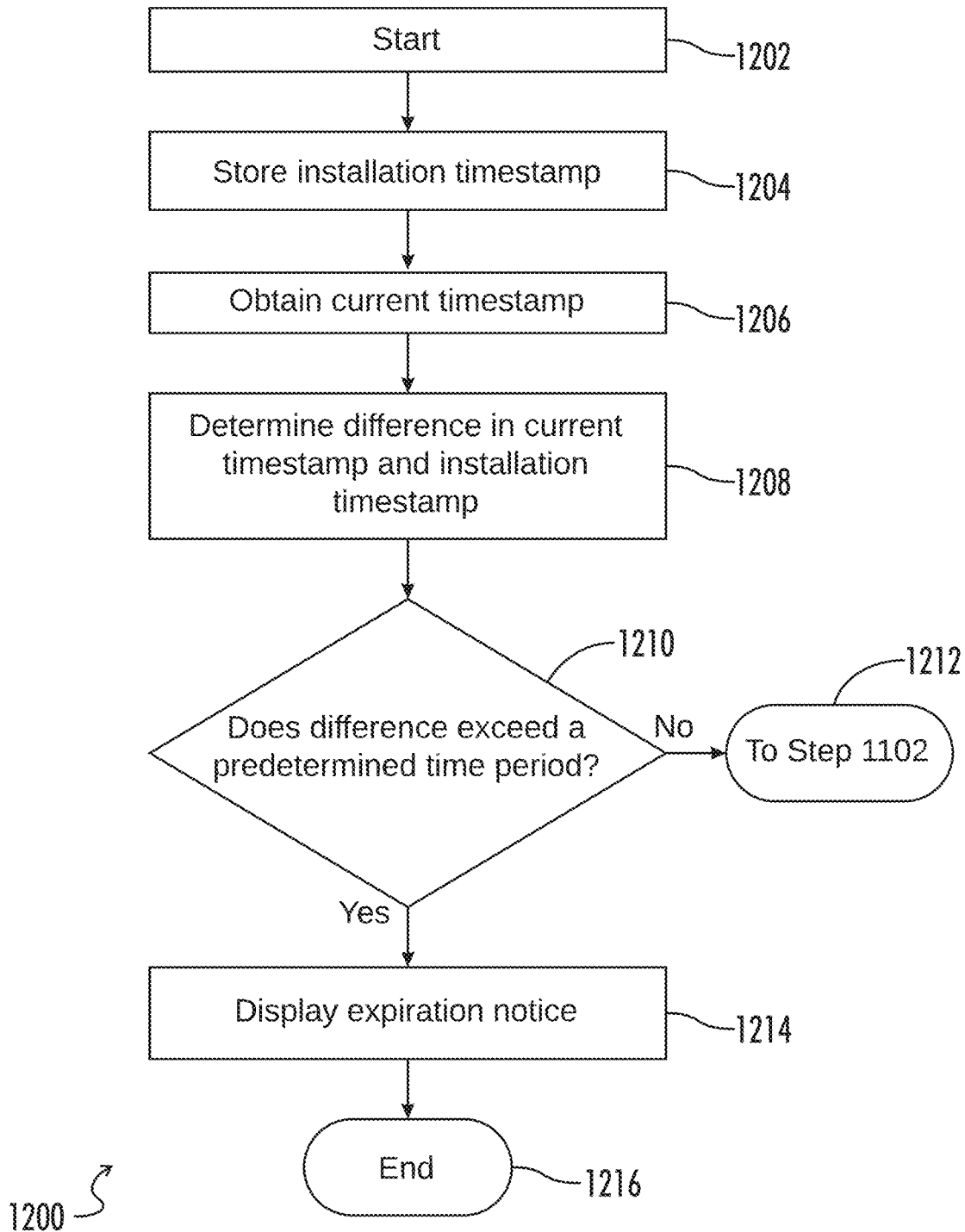
FIG. 12 is a flowchart illustrating an exemplary process for determining a life of a breather according to a breather installation time in accordance with aspects of the present disclosure.

FIG. 12 is a flowchart illustrating an exemplary process 1200 for determining a life of a breather 100 according to a breather installation time in accordance with aspects of the present disclosure. The process 1200 begins at a step 1202. At a step 1204 an installation timestamp is obtained and optionally stored, for example in a variable installedDatetime. The process then continues to a step 1206 where a current timestamp is obtained and is optionally stored, for example in a variable currentDatetime. A difference between the values of current timestamp (e.g., currentDatetime) and the installation timestamp (e.g., installedDatetime) is calculated and optionally stored, for example in a variable timeLapse at step 1208. The process continues to a step 1210 where it is determined whether the value of the difference between the values of the current timestamp and the installation timestamp exceeds a predetermined time period. In various exemplary embodiments, the predetermined time period may be any predetermined or dynamically determined threshold value associated with the breather 100 and/or component thereof, thus any predetermined time period may be used without departing from the spirit and scope of the present disclosure. If it is determined that difference between the values of the current timestamp and the installation timestamp does not exceed the predetermined time period, the process continues to a step 1212 where the process 1100 is performed by returning to the step 1102. If, however, it is determined that difference between the values of the current timestamp and the installation timestamp exceeds the predetermined time period, the process continues to a step 1214 where an expiration notice or expiration signal may be generated and/or presented to a user. The process then ends at a step 1216.

Figure 13:
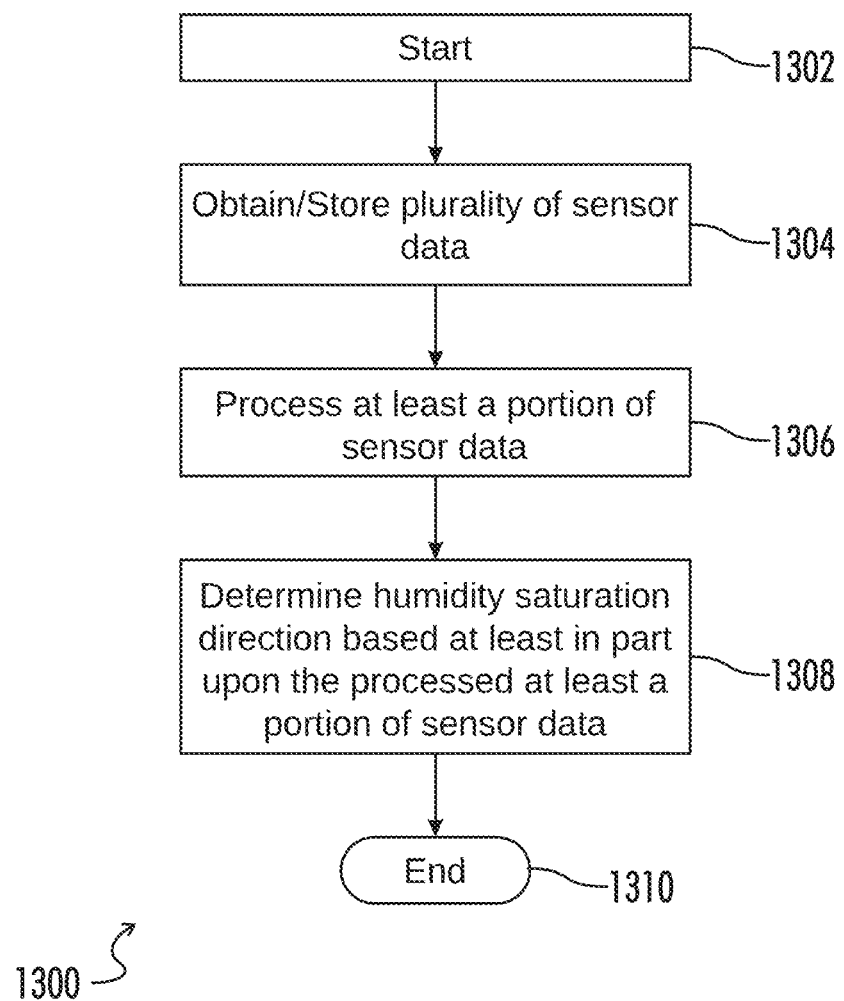
FIG. 13 is a flowchart illustrating an exemplary process for determining a saturation direction based on humidity sensor readings in accordance with aspects of the present disclosure.

FIG. 13 is a flowchart illustrating an exemplary process 1300 for determining a saturation direction associated with a breather 100 based at least in part upon processing sensor data in accordance with aspects of the present disclosure. The process 1300 begins at a step 1302. At a step 1304 at least one set of data is obtained from at least one sensor of a plurality of sensors associated with a breather 100. The obtained at least one set of data may be stored, for example, by a component of the breather 100 or by one or more components communicatively coupleable to the breather 100. At least a portion of obtained sensor data may be processed at a step 1306. The at least a portion of obtained sensor data may be processed locally at the breather 100, remotely from the breather 100, or any combination thereof. In various embodiments, a humidity saturation direction may be determined at a step 1308 based at least in part upon the processed at least portion of sensor data. The process may end at a step 1310.

Figure 14:
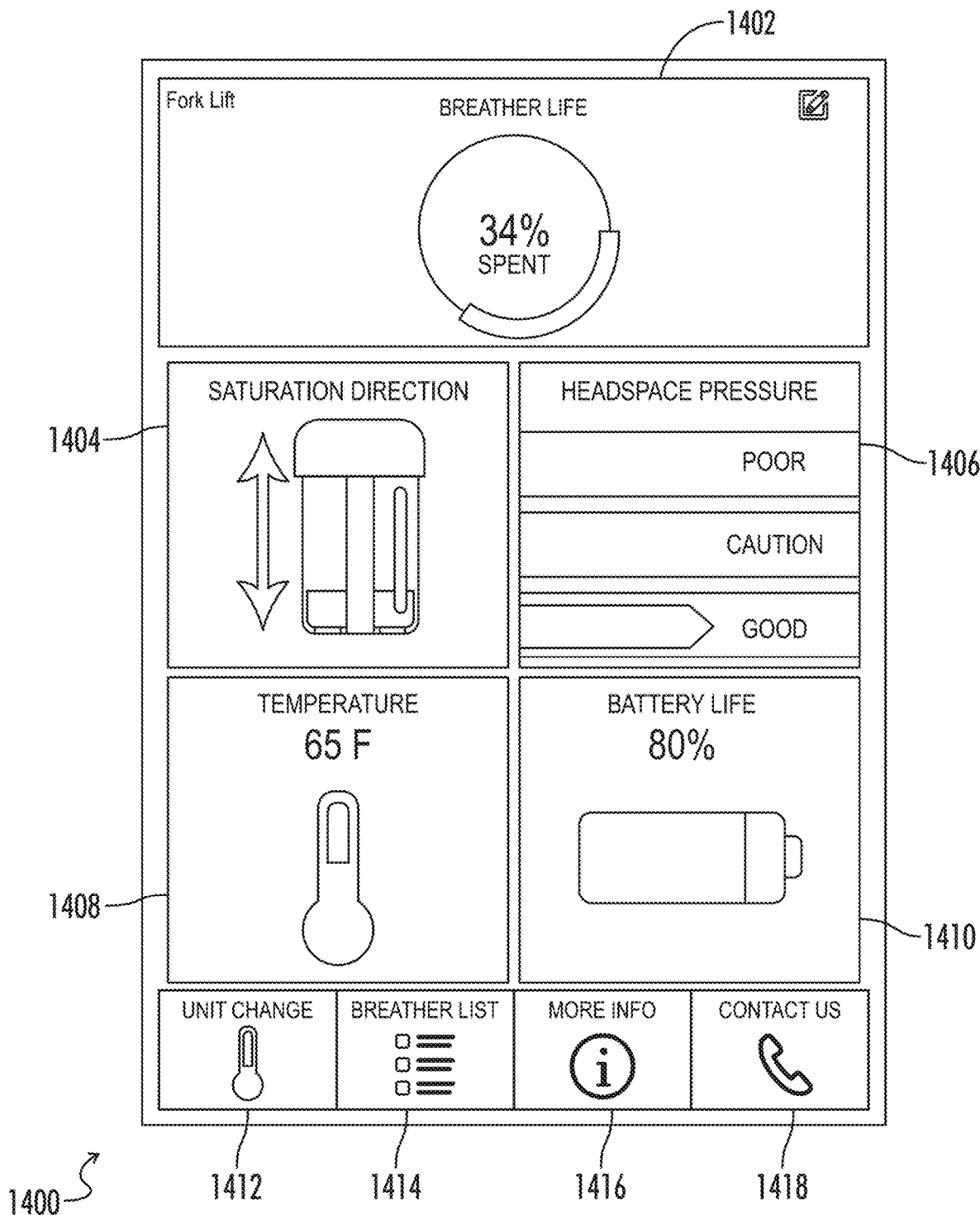
FIG. 14 illustrates an exemplary embodiment of a user interface of a control application according to aspects of the present disclosure.

FIG. 14 illustrates an exemplary embodiment of a user interface 1400 of a control application according to aspects of the present disclosure. The user interface 1400 optionally includes a breather life section 1402. The breather life section 1402 may include an identifier of a particular breather, the estimated remaining life of which maybe visually conveyed to a user. The estimated remaining life data conveyed via the breather life section 1402 may be calculated, in whole or in part, via one or more processes, for example as illustrated by and described herein with reference to FIGS. 11 and 12. At least one estimated remaining life value used to determine visual output in the saturation detection section 1402 may be determined at least in part from information provided to an external device 400 via one or more wired and/or wireless communication paths between the breather 100 and the external device 400 as previously described herein. At least one estimated remaining life value may be determined by data provided from the external pack 400 to the controller application and/or may be determined, in whole or in part, by at least one of the breather 100 or external pack 400 (e.g., by a controller thereof). The controller application may be configured to receive raw sensor data, processed sensor data, and/or determined output values at least in part from the external pack 400 via a wired or wireless communication path between the external pack 400 and the controller application.

The user interface 1400 may optionally include saturation detection section 1404. The saturation detection section 1404 may be configured to visually convey information relating to a humidity saturation direction determined based at least in part upon obtained data received from a first and a second humidity sensor. At least one humidity saturation value used to determine visual output in the saturation detection section 1404 may be determined at least in part from information provided to an external device 400 via one or more wired and/or wireless communication paths between the breather 100 and the external device 400 as previously described herein.

At least one saturation detection value may be determined by data provided from the external pack 400 to the controller application and/or may be determined, in whole or in part, by at least one of the breather 100 or external pack 400 (e.g., by a controller thereof). The controller application may be configured to receive raw sensor data, processed sensor data, and/or determined output values at least in part from the external pack 400 via a wired or wireless communication path between the external pack 400 and the controller application. The saturation direction data presented in the saturation detection section 1404 may correspond to saturation information determined as illustrated by and described with reference to FIG. 13.

The user interface 1400 may optionally include a headspace pressure section 1406. The headspace pressure section 1406 may be configured to visually convey information relating to a measured headspace pressure value of the breather 100. At least one measured headspace pressure value used to determine visual output in the headspace pressure section 1406 may be determined at least in part from information provided to an external device 400 via one or more wired and/or wireless communication paths between the breather 100 and the external device 400 as previously described herein. The at least one headspace pressure value may be determined by data provided from the external pack 400 to the controller application and/or may be determined, in whole or in part, by at least one of the breather 100 or external pack 400 (e.g., by a controller thereof). The controller application may be configured to receive raw sensor data, processed sensor data, and/or determined output values at least in part from the external pack 400 via a wired or wireless communication path between the external pack 400 and the controller application.

The user interface 1400 may optionally include a temperature section 1408. The temperature section 1408 may be configured to visually convey information relating to a measured temperature value of the breather 100. The measured temperature value may be determined, at least in part, according to one or more sensed temperature values, for example measured using at least one temperature sensor of the breather 100. In various embodiments, a plurality of measured temperatures may be averaged as previously described herein. At least one measured temperature value used to determine visual output in the headspace pressure section 1406 may be determined at least in part from information provided to an external device 400 via one or more wired and/or wireless communication paths between the breather 100 and the external device 400 as previously described herein. The at least one temperature value may be determined by data provided from the external pack 400 to the controller application and/or may be determined, in whole or in part, by at least one of the breather 100 or external pack 400 (e.g., by a controller thereof). The controller application may be configured to receive raw sensor data, processed sensor data, and/or determined output values at least in part from the external pack 400 via a wired or wireless communication path between the external pack 400 and the controller application.

The user interface 1400 may optionally include a battery life section 1410. The battery life section 1410 may be configured to visually convey information relating to an operational power measurement associated with the external pack 400. In various embodiments, the battery life section 1410 may be configured to visually convey an estimated remaining power associated with the at least one power source 904. Such battery estimate value may permit a user to determine if and when the at least one power source 904 should be modified, charged, and/or replaced. The control application may be configured to provide one or more alerts and/or warnings to a user based at least in part upon a status of the information conveyed in the battery life section 1410.

The user interface 1400 may optionally include a unit change section 1412. The unit change section 1412 may be selected by a user to permit the user of the control application to view and/or modify one or more unit settings. Unit settings viewable and/or modifiable by a user may include one or more of alarm settings, warning settings, calibration information, tolerance information, operational information, identification information, or any other operational or characteristic information associated with at least one breather 100.

The user interface 1400 may further optionally include a breather list section 1414 configured to permit a user to view and/or select at least one breather to which the user may access, view, or modify information. In one exemplary embodiment, the breather list section 1414 is configured to identify any breathers 100 within range or accessibility of the electronic device executing the control application. For example, the breather list section 1414 may be configured to present all breathers 100 within wireless communication range of the electronic device executing the control application.

The user interface 1400 may include an additional information section 1416 configured to enable a user to select to obtain additional information, such as frequently asked questions, support information, product information, or any other form of information. The user interface 1400 may further include a contact section 1418 configured to permit a user to obtain and/or directly contact a maker of the breather 100 and/or control application.

Figure 15:
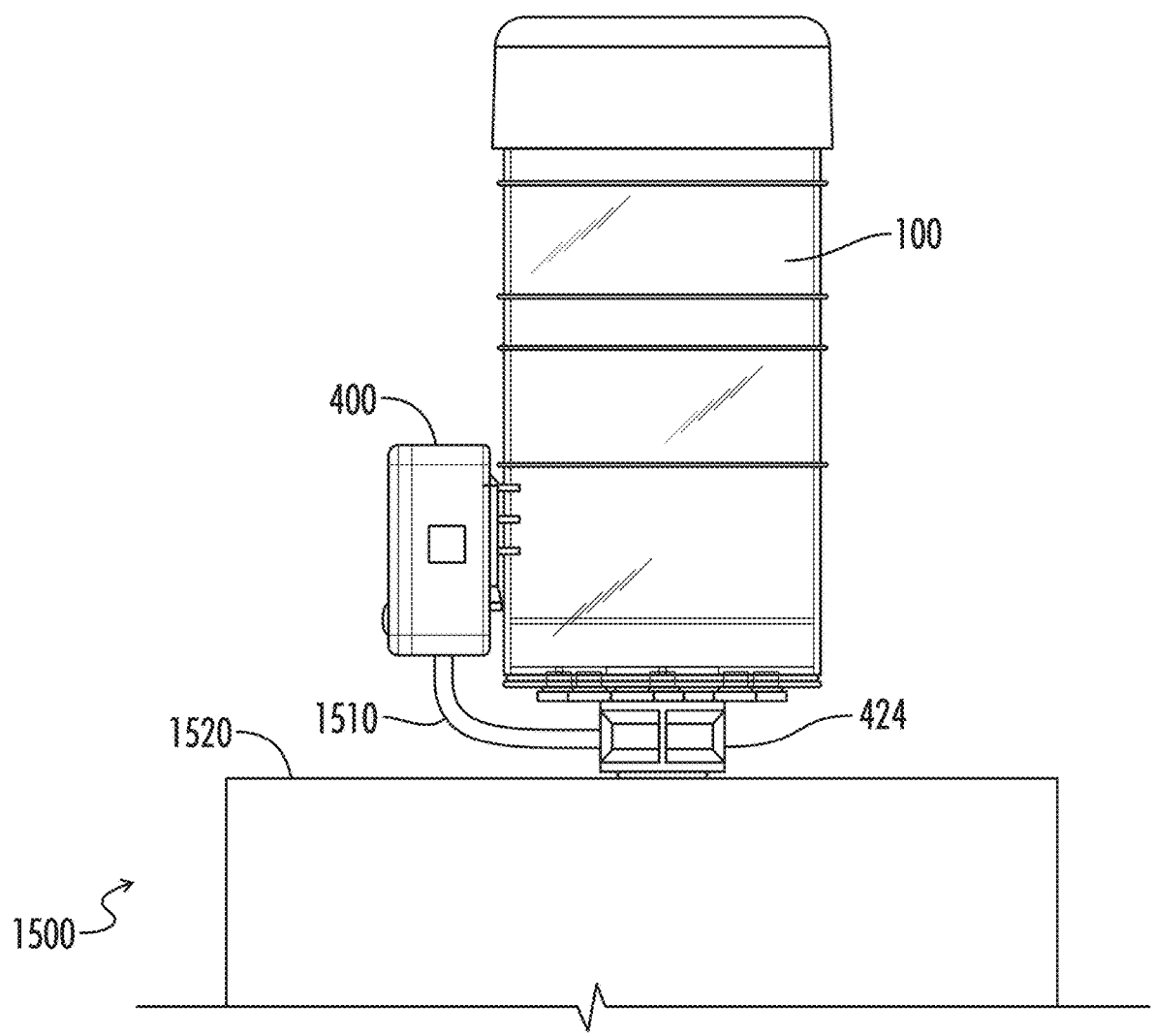
FIG. 15 illustrates a front view of an exemplary embodiment of a breather having a headspace coupler attached thereto according to aspects of the present disclosure.

FIG. 15 illustrates a front view of an exemplary embodiment of a breather having a head space coupler attached thereto according to aspects of the present disclosure. The system 1500 include a breather 100 coupled to a head space 1520 via a mounting element 424. The head space 1520 may correspond to a reservoir as described herein. The system 1500 may include at least one head space coupler 1510 coupled between the mounting element 424 and the external pack 400. The head space coupler 1510 may include at least one passageway configured to transport permit air transfer between the head space 1520 and the external pack 400. In one exemplary embodiment, the head space coupler 1510 is configured as a hose coupled between the head space 1520 and the external pack 400. The head space coupler 1510 may be any rigid or flexible member capable of transporting at least one of air and/or information between the head space 1520 and the external pack 400.

As described below with reference to FIG. 16, the external pack 400 may be configured to include at least one sensor therein, the at least one sensor configured to measure at least one attribute associated with the head space 1520. For example, the sensor within the external pack 400 may be a temperature sensor, a humidity sensor, a pressure sensor, or any other sensor or sensing element configured to determine at least one attribute associated with the head space 1520. The head space coupler 1510 may be an insulated or non-insulated rubber hose in one embodiment, although any material may be used within the scope of the present disclosure. Although not illustrated, the head space coupler 1510 may include one or more elements configured to perform one or more operations on airflow between the head space 1520 and the external pack 400. For example, at least one element may be configured to condition and/or measure at least one attribute of air transferred from the head space 1520 to the external pack 400 (e.g., temperature, pressure, humidity, airflow speed, or any other parameter).

Figure 16:
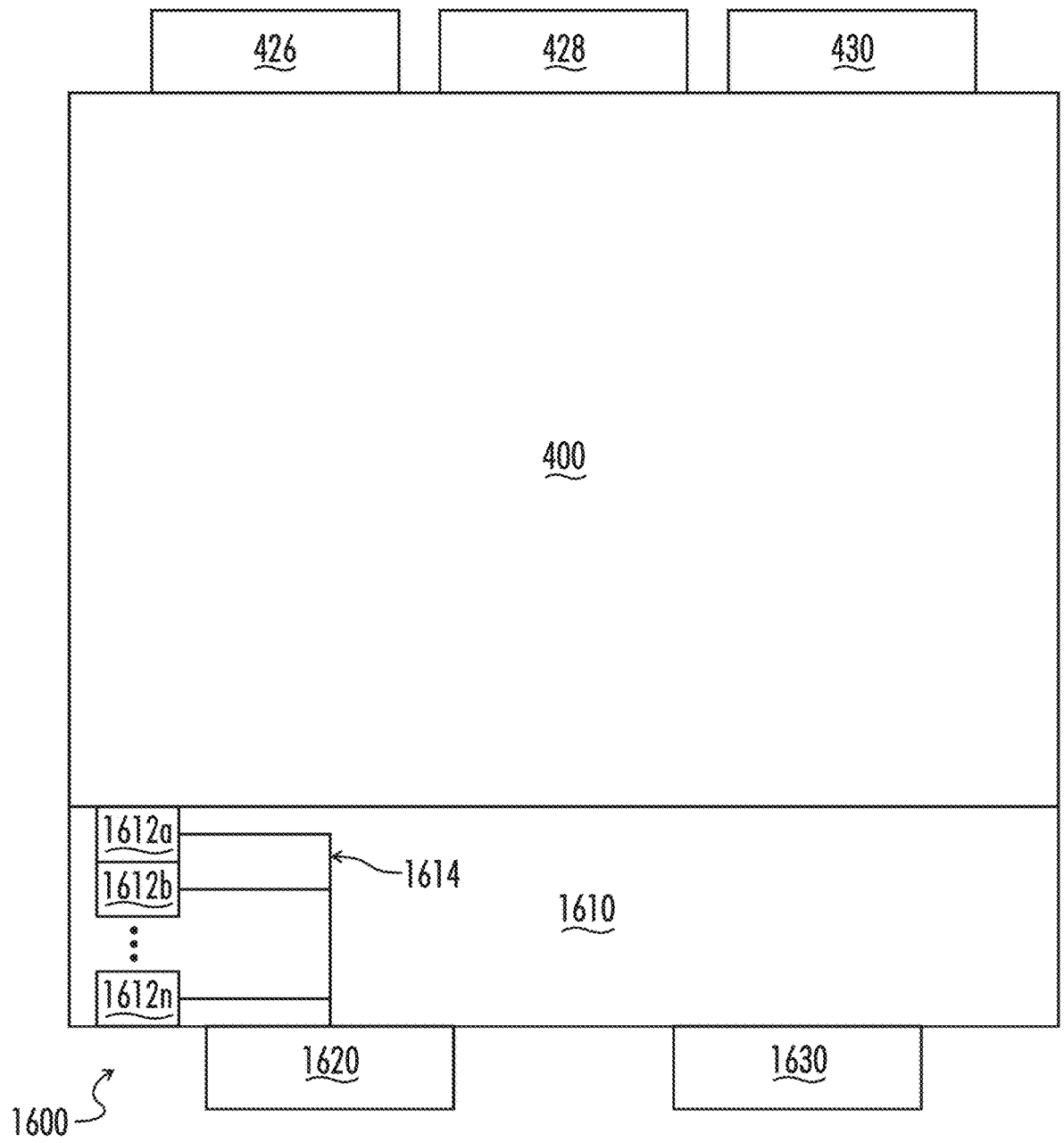
FIG. 16 illustrates a block diagram of an exemplary expansion pack according to aspects of the present disclosure.

FIG. 16 illustrates a block diagram of an exemplary expansion pack 1600 according to aspects of the present disclosure. The expansion pack 1600 may include one or more elements of an external pack 400 as described herein. For example, the external pack 400 may include one or more elements as illustrated by and described with reference to FIG. 9, above. The expansion pack 1600 may include at least one portion 1610. The portion 1610 may include a cavity or section at least partially within the expansion pack 1600. Additionally or alternatively, at least a portion of the portion 1610 may be included within, outside of, of partially inside and/or outside of an interior section of the expansion pack 1600. In one exemplary embodiment, the portion 1610 may be configured to couple to the external pack 400/1600 via one or more physical and/or communicatively couplings. For example, an external pack 400 may be configured to be retrofitted with a portion 1610 without departing from the spirit and the scope of the present disclosure.

The portion 1610 may include one or more sensor 1612. For example, in the embodiment illustrated by FIG. 16, the portion 1610 may include any number of sensors 1612*a*, 1612*b*, . . . , 1612*n*. Each of the one or more sensors 1612 may include a temperature sensor, a humidity sensor, a pressure sensor, or any other sensor previously described herein. One more sensor 1612 may be coupled to a head space coupler 1510 via a port 1630. One or more sensor 1612 may be coupled to a communication module 1620 via at least one bus 1614. In one exemplary embodiment, the communication module 1620 may be configured to operate as previously described with reference to the communication module 430. Additionally or alternatively, at least a portion of information may be received by and/or transmitted from the communication module 430 (e.g., via the at least one bus 1614). Although illustrated in FIG. 16 as being physically separate from at least one element of the external pack 400, it should be appreciated that in some embodiments, at least a portion of various elements of each of the external pack 400 and the portion 1610 may occupy a common area and/or enclosure.

Using the embodiment illustrated by FIGS. 15 & 16, it is possible to provide real-time conditions of an asset by directly measuring head space conditions of the asset. To interpret asset head space conditions (e.g., temperature, pressure, and/or humidity), one or more sensors such as one or more temperature/humidity sensors and one or more pressure sensors placed in the expansion pack 1600 in direct communication with the head space 1520 of the asset via the head space coupler 1510. One end of the head space coupler 1510 may be coupled to the expansion pack 1600 while the other end may be coupled to a bottom section of mounting element 424 (e.g., a breather standpipe). As such, direct sensing of at least one head space parameter may be performed at the portion 1610 of the expansion pack 1600. In one exemplary embodiment, one or more sets of sensor data may be obtained by each of the expansion pack 1600 and one or more sensors of the breather 100, and sets of sensor data from each of the expansion pack 1600 and the breather 100 may be obtained and/or used to perform one or more calculations, determination, operations, and/or outputs described herein.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of new and useful SYSTEMS AND APPARATUSES FOR A DIAGNOSTIC BREATHER DRYER HAVING A COUPLEABLE EXPANSION PACK it is not intended that such references be construed as limitations upon the scope of this invention except as set forth in the following claims.

What is claimed is:

1. A breather for a reservoir, the breather comprising:
a housing, the housing including:
a dehumidifying element positioned within the housing such that air passing through the breather from the outside to the inside or from the inside to the outside of the reservoir must pass through the dehumidifying element; and
an operational sensor positioned within the housing, wherein the operational sensor is configured to output a sensor signal indicative of a measured operational parameter of the breather; and
an expansion pack coupleable to the housing, the expansion pack configured to receive the sensor signal indicative of the measured operational parameter and to transmit at least one of the measured operational parameter or a representation thereof, wherein the expansion pack comprises at least one sensor and further comprises an intake section configured to couple to a head space coupler, wherein the at least one sensor is configured to measure at least one parameter associated with a medium received at the intake section.

2. The breather of claim 1, wherein the breather comprises a plurality of operational sensors each coupleable to the expansion pack when the expansion pack is coupled to the breather.

3. The breather of claim 2, wherein the plurality of operational sensors comprises a temperature sensor configured to measure a temperature of an inside of the housing adjacent to the temperature sensor, a first humidity sensor configured to measure a first humidity level adjacent to a location of the first humidity sensor within the housing, and a second humidity sensor configured to measure a second humidity level adjacent to a location of the second humidity sensor within the housing, and
wherein the expansion pack is configured to transmit each of a representation of an output of the temperature sensor, a representation of an output of the first humidity sensor, and a representation of an output of the second humidity sensor.

4. The breather of claim 3, wherein the expansion pack is configured to transmit each of the representation of the output of the temperature sensor, the representation of the output of the first humidity sensor, and the representation of the output of the second humidity sensor via a physically wired communication interface.

5. The breather of claim 3, wherein the expansion pack is configured to transmit each of the representation of the output of the temperature sensor, the representation of the output of the first humidity sensor, and the representation of the output of the second humidity sensor via a wireless communication interface.

6. The breather of claim 3, wherein the expansion pack includes a controller, the controller configured to perform at least one operation upon at least one of the representation of the output of the temperature sensor, the representation of the output of the first humidity sensor, or the representation of the output of the second humidity sensor, and to transmit at least a representation of the operation upon at least one of the representation of the output of the temperature sensor, the representation of the output of the first humidity sensor, or the representation of the output of the second humidity sensor.

7. The breather of claim 6, wherein the controller is configured to determine at least one end of life parameter based at least in part upon one or more of the representation of the output of the temperature sensor, the representation of the output of the first humidity sensor, and the representation of the output of the second humidity sensor.

8. The breather of claim 7, wherein the controller is configured to transmit a representation of the determined at least one end of life parameter.

9. The breather of claim 1, wherein the at least one sensor comprises at least one of a temperature sensor, a humidity sensor, and a pressure sensor, wherein the at least one sensor is configured to measure the at least one parameter from air received via the intake section.

10. A system for providing a breather for a reservoir, the system comprising:
a breather having:
a housing;
a dehumidifying element positioned within the housing such that air passing through the breather from the outside to the inside or from the inside to the outside of the reservoir must pass through the dehumidifying element;
an operational sensor positioned within the housing, wherein the operational sensor is configured to output a sensor signal indicative of a measured operational parameter of the breather; and
an expansion pack coupleable to the housing, the expansion pack configured to receive the sensor signal indicative of the measured operational parameter and to transmit at least one of the measured operational parameter or a representation thereof;
a control unit communicatively coupleable to the expansion pack, the control unit including a processor, a display unit, and a storage, the processor configured to execute a control application stored in the storage and configured to receive the at least one of the measured operational parameter or representation thereof; and
a head space coupler coupleable between the reservoir and the expansion pack,
wherein the expansion pack comprises at least one sensor and further comprises an intake section configured to couple to the head space coupler, wherein the at least one sensor is configured to measure at least one parameter associated with a medium received at the intake section.

11. The system of claim 10, wherein the control unit is configured to communicatively couple to the expansion pack via at least one communication path.

12. The system of claim 11, wherein the at least one communication path is a physically wired communication path.

13. The system of claim 11, wherein the at least one communication path is a wireless communication path.

14. The system of claim 10, wherein the display unit is configured to display at least one of an end of life parameter or an operational characteristic of the breather based at least in part upon the sensor signal.

15. The system of claim 10, wherein the control unit comprises a controller configured to perform one or more operations upon the received at least one of the measured operational parameter or representation thereof, to determine at least one of an end of life parameter or an operational characteristic of the breather based at least in part upon a result of the one or more operations upon the received at least one of the measured operational parameter or representation thereof, and to output a visual indication of the determined at least one of the end of life parameter or the operational characteristic of the breather via the display unit.

16. The system of claim 10, wherein the breather comprises a plurality of operational sensors each coupleable to the expansion pack when the expansion pack is coupled to the breather.

17. The system of claim 16, wherein the plurality of operational sensors comprises a temperature sensor configured to measure a temperature of an inside of the housing adjacent to the temperature sensor, a first humidity sensor configured to measure a first humidity level adjacent to a location of the first humidity sensor within the housing, and a second humidity sensor configured to measure a second humidity level adjacent to a location of the second humidity sensor within the housing, and wherein the expansion pack is configured to transmit each of a representation of an output of the temperature sensor, a representation of an output of the first humidity sensor, and a representation of an output of the second humidity sensor.

18. The system of claim 17, wherein the expansion pack is configured to transmit each of the representation of the output of the temperature sensor, the representation of the output of the first humidity sensor, and the representation of the output of the second humidity sensor via a physically wired communication interface.

19. The system of claim 17, wherein the expansion pack is configured to transmit each of the representation of the output of the temperature sensor, the representation of the output of the first humidity sensor, and the representation of the output of the second humidity sensor via a wireless communication interface.

20. The system of claim 15, wherein the controller is configured to determine at least one end of life parameter based at least in part upon one or more of the output of the temperature sensor, the output of the first humidity sensor, and the output of the second humidity sensor.

21. The system of claim 20, wherein the controller is configured to transmit a representation of the determined at least one end of life parameter to the control unit, the control unit configured to display at least one of an end of life parameter or an operational characteristic of the breather based at least in part upon the one or more of the output of the temperature sensor, the output of the first humidity sensor, and the output of the second humidity sensor.

22. The system of claim 10, wherein the at least one sensor comprises at least one of a temperature sensor, a humidity sensor, and a pressure sensor, wherein the at least one sensor is configured to measure the at least one parameter from air received via the intake section.

* * * * *